US010751616B2

(12) United States Patent
Ozawa

(10) Patent No.: US 10,751,616 B2
(45) Date of Patent: Aug. 25, 2020

(54) CONTROL PROGRAM, CONTROL METHOD, AND COMPUTER

(71) Applicant: GREE, Inc., Tokyo (JP)

(72) Inventor: Yusuke Ozawa, Tokyo (JP)

(73) Assignee: GREE, Inc., Tokyo (JP)

( * ) Notice: Subject to any disclaimer, the term of this patent is extended or adjusted under 35 U.S.C. 154(b) by 73 days.

(21) Appl. No.: 15/603,752

(22) Filed: May 24, 2017

(65) Prior Publication Data

US 2018/0001196 A1 Jan. 4, 2018

(30) Foreign Application Priority Data

Jun. 30, 2016 (JP) ................................ 2016-131109

(51) Int. Cl.

| A63F 13/46 | (2014.01) |
|---|---|
| A63F 13/45 | (2014.01) |
| A63F 13/426 | (2014.01) |
| A63F 13/537 | (2014.01) |
| A63F 13/58 | (2014.01) |
| A63F 13/847 | (2014.01) |
| A63F 13/55 | (2014.01) |

(Continued)

(52) U.S. Cl.
CPC ............ *A63F 13/46* (2014.09); *A63F 13/335* (2014.09); *A63F 13/35* (2014.09); *A63F 13/426* (2014.09); *A63F 13/45* (2014.09); *A63F 13/537* (2014.09); *A63F 13/55* (2014.09); *A63F 13/58* (2014.09); *A63F 13/60* (2014.09); *A63F 13/79* (2014.09); *A63F 13/795* (2014.09); *A63F 13/822* (2014.09); *A63F 13/847* (2014.09); *A63F 13/85* (2014.09); *A63F 13/92* (2014.09); *A63F 2300/407* (2013.01)

(58) Field of Classification Search
CPC ......... A63F 13/46; A63F 13/335; A63F 13/35
USPC ............................................................ 463/9
See application file for complete search history.

(56) References Cited

U.S. PATENT DOCUMENTS

| 2011/0275439 | A1* | 11/2011 | Terada | .................... | A63F 13/49 463/42 |
|---|---|---|---|---|---|
| 2017/0236237 | A1* | 8/2017 | Smuts | .................... | G06N 5/022 700/92 |

FOREIGN PATENT DOCUMENTS

| JP | 2014000162 A | 1/2014 |
|---|---|---|
| JP | 2015070970 A | 4/2015 |
| JP | 2015131036 A | 7/2015 |

OTHER PUBLICATIONS

Office Action corresponding application No. JP 2016-131109 dated Sep. 6, 2016; 9 pgs.

* cited by examiner

*Primary Examiner* — Jay Trent Liddle
*Assistant Examiner* — Ryan Hsu
(74) *Attorney, Agent, or Firm* — Maier & Maier, PLLC

(57) ABSTRACT

A control program causing a computer to execute a competition between two players, based on a correction value obtained by correcting a reference value of at least one player of the two players, the two players respectively belonging to two groups, to store a point which may be determined based on the reference value of at least the one player, in a storage unit in association with a group to which the winning player belongs, and to determine a result of the competition between groups, based on the summation of points which may be stored in the storage unit in association with each group. In a case where a predetermined action is performed on the predetermined game content of the group to which at least the one player belongs, control may be (Continued)

performed to change the correction value of the player and not to change the reference value.

7 Claims, 10 Drawing Sheets

(51) Int. Cl.
    *A63F 13/795*     (2014.01)
    *A63F 13/335*     (2014.01)
    *A63F 13/35*     (2014.01)
    *A63F 13/60*     (2014.01)
    *A63F 13/79*     (2014.01)
    *A63F 13/822*     (2014.01)
    *A63F 13/85*     (2014.01)
    *A63F 13/92*     (2014.01)

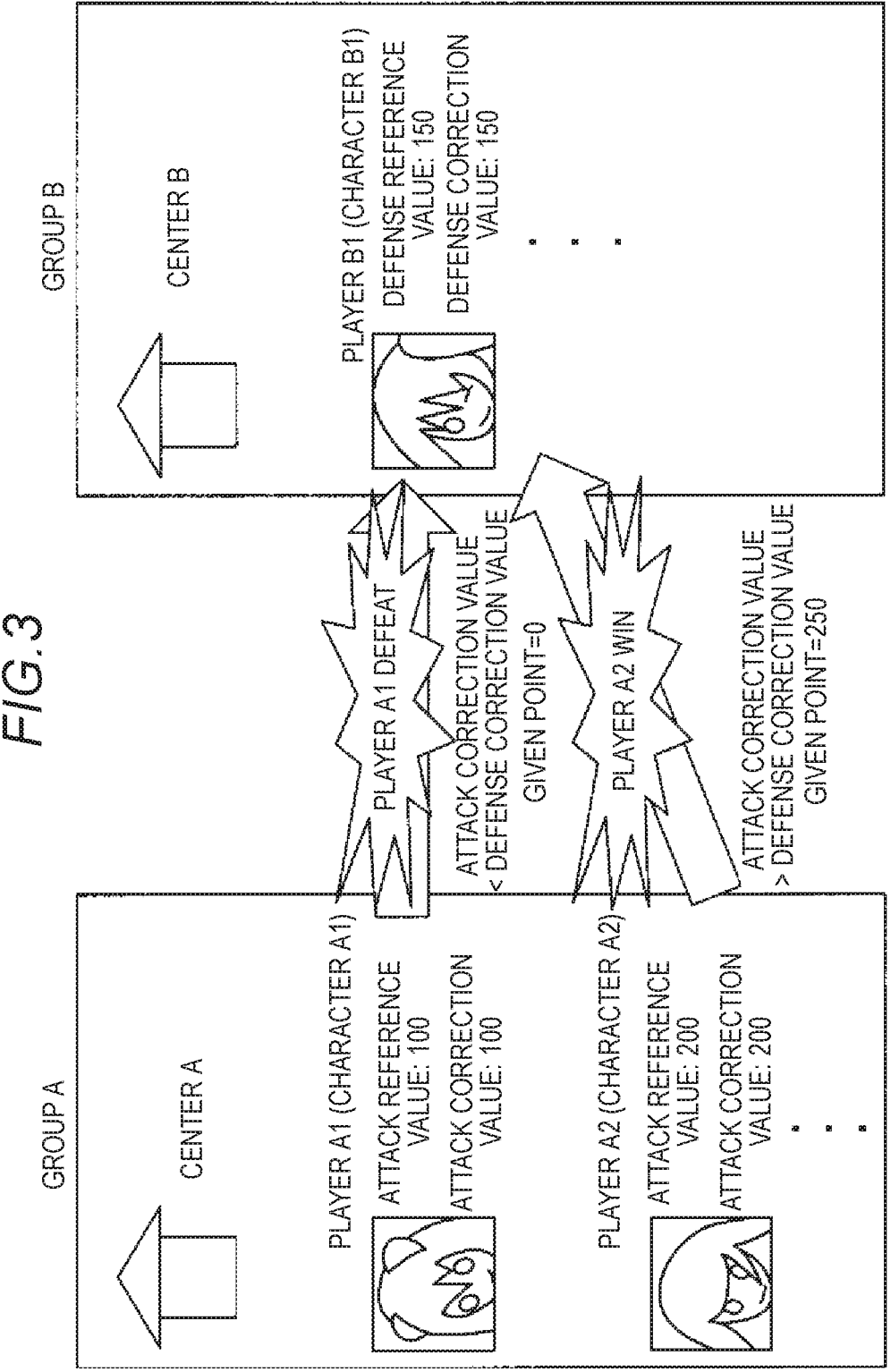

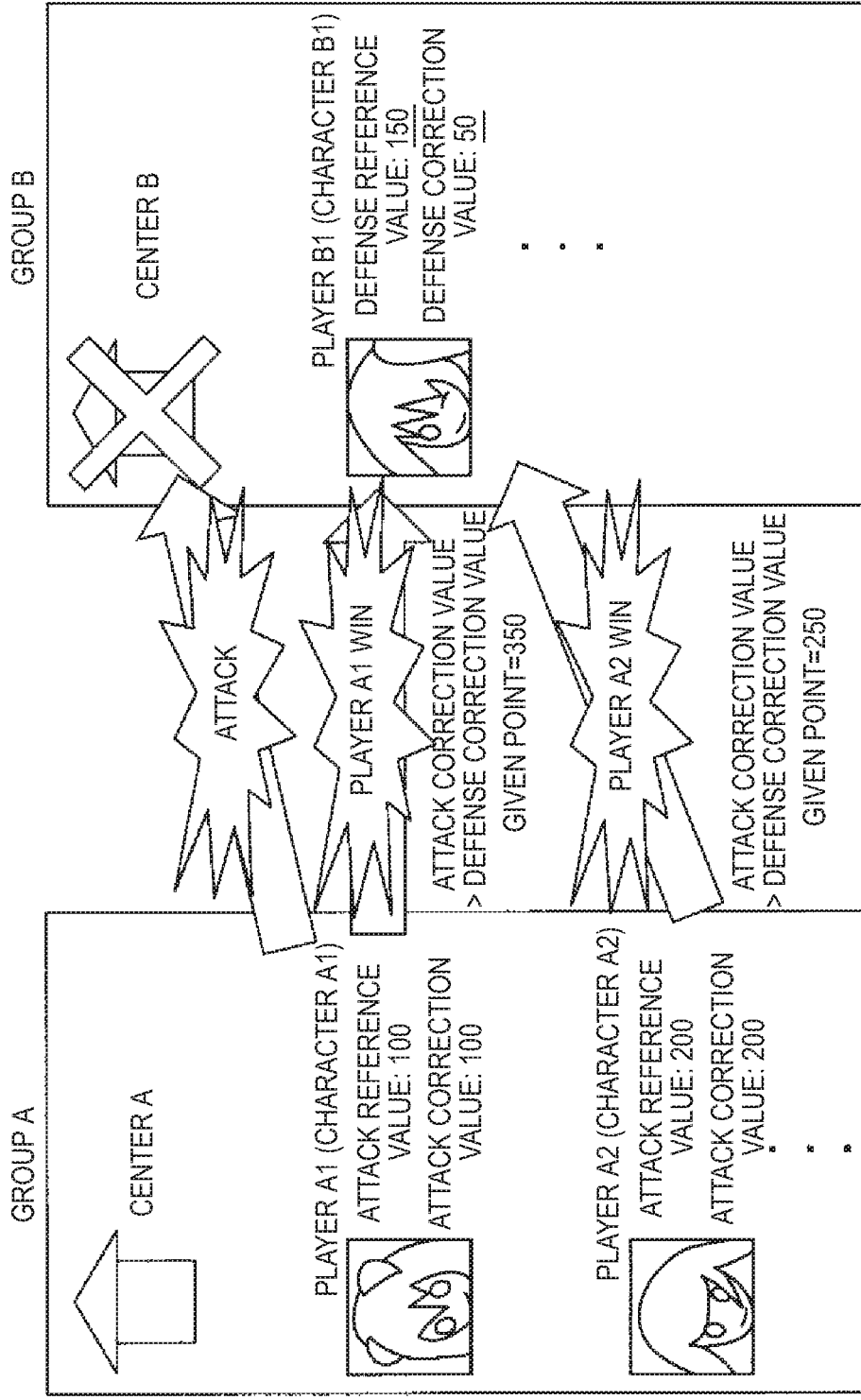

FIG.8A

| PLAYER ID | PASSWORD | NAME | AVATAR IMAGE | OWNED ITEM ID | COMPETITION PARAMETER (ATTACK REFERENCE VALUE, DEFENSE REFERENCE VALUE, ...) | PHYSICAL STRENGTH | TOTAL POINTS | GROUP ID |
|---|---|---|---|---|---|---|---|---|
| P_001 | xxxx | PLAYER A1 | IMAGE A | I_001,··· | (100,100,...) | 100 | 300 | G_001 |
| P_101 | xxxx | PLAYER B1 | IMAGE B | I_101,··· | (200,200,...) | 100 | 200 | G_002 |
| ⋮ | ⋮ | ⋮ | ⋮ | ⋮ | ⋮ | ⋮ | ⋮ | ⋮ |

FIG.8B

| GROUP ID | BELONGING PLAYER ID | CENTER ID | CENTER NAME | CENTER IMAGE | OPPONENT GROUP ID | NUMBER OF TIMES OF CENTER BEING ATTACKED | TOTAL POINTS |
|---|---|---|---|---|---|---|---|
| G_001 | P_001, P_002, ⋮ | C_001 | CENTER A | CENTER IMAGE A | G_002 | 1 | 1000 |
| G_002 | P_101, P_102, ⋮ | C_002 | CENTER B | CENTER IMAGE B | G_001 | 0 | 500 |
| ⋮ | ⋮ | ⋮ | ⋮ | ⋮ | ⋮ | ⋮ | ⋮ |

CONTROL PROGRAM, CONTROL METHOD, AND COMPUTER

BACKGROUND OF THE INVENTION

Field of the Invention

The present invention relates to a control program, a control method, and a computer.

Background Art

Servers configured to provide a game for a portable terminal through a communication network are widely used in the art. As a game provided by such a server, a game (so-called game content "social network game") which permits the participation of a plurality of players is known. Games which may be provided as a social network game includes competition games in which players compete with each other.

JP-A-2014-00162 discloses a (team battle) game in which a plurality of players form teams, and the formed teams perform competition with each other. In the team battle, each of the players representing one team and each of the players representing the counterpart team compete by using decks of the players, and wins and defeats for the team battles are determined based on the number of wins or the number of defeats in the player competitions.

SUMMARY OF THE INVENTION

In such a competition game, since each player intends to contribute to their own team, players can be attracted to the competition game. However, in such a team battle, a method of determining win and defeat of a competition between players, and a method of determining win and defeat in a competition between teams are monotonous. Thus, the player may lose the will to continue the game.

To solve the above problem, an object of the present invention is to provide a control program, a control method, and a computer in which strategic characteristics can be improved, and the will of a player to continue the game can be maintained, in a game in which a competition between groups to which a plurality of players belong is performed.

According to an aspect of the present invention, there may be provided a control program for a computer which includes a storage unit and executes a competition game between a plurality of groups to which a plurality of players belong. The storage unit may store a reference value of a competition parameter for each of the plurality of players, and may store a predetermined game content for each of the plurality of groups. The control program may cause the computer to execute steps of: executing a competition between two players, based on a correction value obtained by correcting the reference value of at least one player of the two players which respectively belong to two groups in the plurality of groups; storing a point which is determined based on the reference value of at least the one player, in the storage unit in association with the group to which the winning player in the competition belongs; and determining a result of the competition between the groups, based on the summation of points which are stored in the storage unit in association with each group. In a case where a predetermined action is performed on the predetermined game content of the group to which at least the one player belongs, control may be performed to change the correction value of the player and not to change the reference value. The computer may perform the above processes. For example, the computer may be a portable terminal, a fixed terminal, and a server.

According to an exemplary embodiment of a control program, the predetermined game content of each group may be a game content relating to a character of a predetermined player belonging to each group, and the predetermined action may be an attack to the predetermined game content.

According to an exemplary embodiment of a control program, in executing the competition, a game screen for displaying so as not to be capable of recognizing the predetermined game content from game media provided in the other group may be displayed in a terminal of the player belonging to the one group of the two groups, and a game screen for displaying so as to be capable of recognizing the predetermined game content from the game media provided in the other group may be displayed in a terminal of the player belong to the other group.

According to an exemplary embodiment of a control program, points may be determined to be increased as a value obtained by subtracting the reference value of the losing player from the reference value of the winning player becomes smaller.

According to an exemplary embodiment of a control program, points may be corrected based on a relation between the reference value of the winning player and reference values of players belonging to the group to which the winning player belongs, and a relation between the reference value of the losing player and the reference value of each of the players belonging to the group to which the losing player belongs.

According to an exemplary embodiment of a control program, in the control, the correction value may be reduced every time the predetermined action is performed on the predetermined game content, and the correction value may be restored with time.

According to an exemplary embodiment of a control program, in the control, the correction value may be changed in accordance with at least one of the number of times that a specific player belonging to one group consecutively wins against players belonging to the other group, or the number of times that a plurality of players belonging to the one group alternately win against the players belonging to the other group.

According to another exemplary embodiment, there may be provided a control method for a computer which includes a storage unit and executes a competition game between a plurality of groups to which a plurality of players respectively belong. The storage unit may store a reference value of a competition parameter for each of the plurality of players, and may store a predetermined game content for each of the plurality of groups. The control method may include executing a competition between two players, based on a correction value obtained by correcting the reference value of at least one player of the two players which respectively belong to two groups in the plurality of groups; storing a point which is determined based on the reference value of at least the one player, in the storage unit in association with the group to which the winning player in the competition belongs; and determining a result of the competition between the groups, based on the summation of points which are stored in the storage unit in association with each group. In a case where a predetermined action is performed on the predetermined game content of the group to which at least the one player belongs, control may be performed to change the correction value of the player and not to change the reference value.

According to another exemplary embodiment, there may be provided a computer which performs a competition game between a plurality of groups to which a plurality of players respectively belong. The computer may include a storage unit that may store a reference value of a competition parameter of each of the plurality of players, and may store a predetermined game content for each of the plurality of groups, a first competition execution unit that executes a competition between two players, based on a correction value obtained by correcting the reference value of at least one player of the two players who respectively belong to two groups in the plurality of groups, an association unit that may store a point which is determined based on the reference value of at least the one player, in the storage unit in association with the group to which the winning player in the competition belongs, and a second competition execution unit that determines a result of the competition between groups, based on the summation of points which are stored in the storage unit in association with each group. In a case where a predetermined action is performed on the predetermined game content of the group to which at least the one player belongs, the first competition execution unit may perform control to change the correction value of the player and not to change the reference value.

In an exemplary embodiment, the control method, the computer, and the control program can improve strategic characteristics and maintain the will of a player to continue a game in the game in which a competition between groups to which a plurality of players belongs is performed.

BRIEF DESCRIPTION OF THE DRAWINGS

FIG. 3 is a schematic diagram illustrating a competition game.

FIG. 4 is a schematic diagram illustrating the competition game.

FIG. 8A is a diagram illustrating an example of a player table.

FIG. 8B is a diagram illustrating an example of a group table.

DETAILED DESCRIPTION OF THE INVENTION

Figure 1:
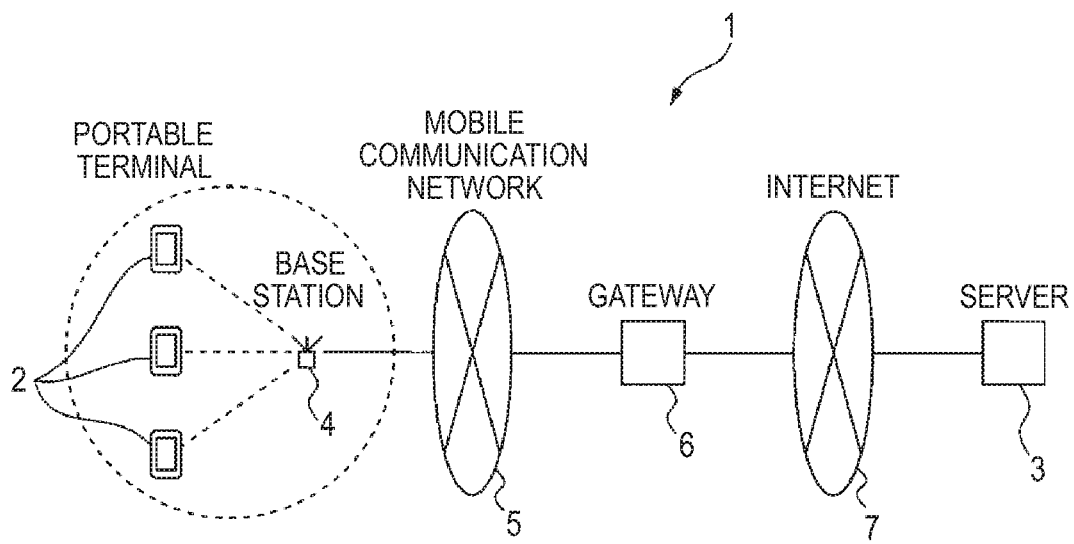
FIG. 1 is a diagram illustrating an example of a schematic configuration of a game system.

Hereinafter, various exemplary embodiments will be described with reference to the drawings. It is noted that the technical range of the present invention may not be limited to the embodiments, and the inventions described in claims and equivalents thereof are included.

1. Outline of a First Exemplary Embodiment

In a game system according to an exemplary embodiment, a player may perform a competition game provided by a server, by using a portable terminal.

In the competition game, a game content is used. The game content may be electronic data used in a game. The game content may include, for example, a card, an item, a character, an object, and an avatar. The game content may be electronic data obtained by acquiring, holding, using, managing, exchanging, synthesizing, reinforcing, selling, discarding, and/or giving of a player in a game with the progress of the game. However, the forms of game content that may be used may not be limited to the descriptions in this specification.

In the competition game, the server may classify a plurality of players into plurality of groups (so-called guild). The server may cause game media such as characters, which are held by players belonging to the groups to perform a competition with each other, so as to perform competition game between a plurality of groups.

In the competition game, each character held by the player may have a competition parameter used in a competition. Examples of the competition parameter may include attack power, defense power, physical strength (or HP (hit point)), an attribute (for example, fire, water, and lightning), rarity (for example, normal, rare, super (S) rare, double-super (SS) rare, triple-super (SSS) rare, and legend), an activation rate of a skill (special effect), an attack speed (a number of times an attack may be performed in one turn, a number of turns until an attack may be performed, and the like), and the number of times that defense is performed in one competition.

In the competition game, a game content of a center and the like may be set for each group. The center may be an object which may be attacked from a character of a player belonging to a group which may be a competition counterpart.

In the competition game, a reference value may be predetermined in each competition parameter of each character. A competition between players may be performed based on a correction value obtained by correcting the reference value of the competition parameter which may be set for each character. A point which may be determined based on the reference value set for each character may be assigned to a group to which the winning player in the competition belongs. An initial value of the correction value when the competition game starts may be set to a value which may be the same as the reference value. In a case where the center set for each group is attacked, the server may reduce the correction value which may be set for the character of each player belonging to the group, but may not change the reference value.

A player may perform a competition with another player who uses a character having a large reference value, and thus can acquire more points. However, the character having a large reference value also may have a large correction value when the competition game starts. Thus, the first player may have a high probability of becoming a losing player. Thus, a player may first cause a character to attack a center set for the opponent group with which a competition may be performed, so as to reduce a correction value set for a character of the opponent player who performs the competition. Then, the player may cause the character to attack the character of the opponent player. An attack to the center for the opponent group to which the opponent player belongs may be an example of a predetermined action. Thus, a player can improve the probability of winning against an opponent player who uses a character having a large reference value, and acquire a higher number of points. In this manner, the game system achieves improvement of strategic characteristics and better maintains the will of a player to continue a competition game in the game.

2. Configuration of Game System 1

FIG. 1 is a diagram illustrating an example of a schematic configuration of a game system 1.

The game system 1 may include at least one portable terminal 2 and a server 3. The portable terminal 2 and the server 3 may be connected to each other through, for example, a communication network such as a base station 4, mobile communication network 5, a gateway 6, and the Internet 7. A program (for example, a browsing program) executed in the portable terminal 2 and a program (for example, a game program) executed in the server 3 may communicate with each other by using a communication protocol such as the Hypertext Transfer Protocol (HTTP).

A multi-function portable phone (so-called a "smart phone") may be assumed as the portable terminal 2, but the present invention may not be limited thereto. As the portable terminal 2, any device may be provided as long as the present invention can be applied. For example, a portable phone (so-called a "feature phone"), a portable information terminal (personal digital assistant, PDA), a portable game machine, a portable audio player, a tablet terminal, a tablet PC, and a notebook PC may be provided.

2.1. Configuration of Portable Terminal 2

Figure 2:
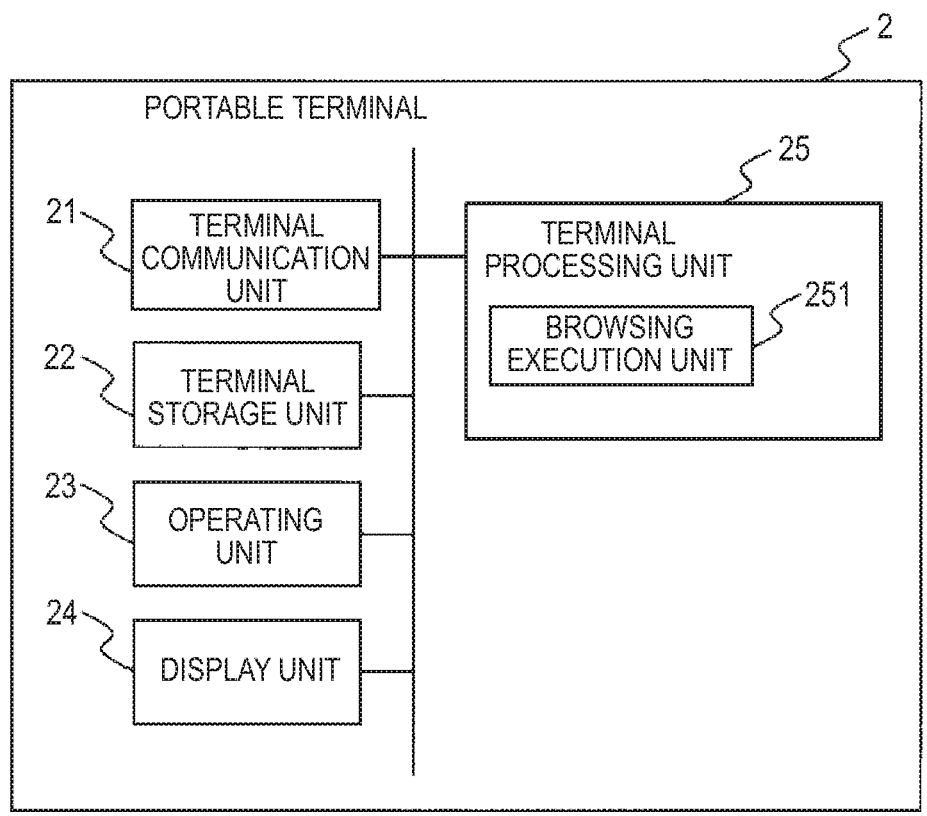
FIG. 2 is a diagram illustrating an example of a schematic configuration of a portable terminal.

FIG. 2 is a diagram illustrating an example of a schematic configuration of the portable terminal 2.

The portable terminal 2 may include a terminal communication unit 21, a terminal storage unit 22, an operating unit 23, a display unit 24, and a terminal processing unit 25. The portable terminal 2 may require the progress of a game for the server 3 in accordance with an operation of the operating unit (button and the like) 23 by a player. The portable terminal 2 may receive display data regarding the progress of the game, from the server 3, and displays the received display data.

The terminal communication unit 21 may include a communication interface circuit which may include an antenna having a predetermined frequency band as a reception band. The terminal communication unit 21 may connect the portable terminal 2 to a wireless communication network. The terminal communication unit 21 may establish a wireless signal line by the code division multiple access (CDMA) scheme and the like, between the portable terminal 2 and the base station 4 through a channel allocated by the base station 4. Thus, the terminal communication unit 21 may communicate with the base station 4. The terminal communication unit 21 may transmit data supplied from the terminal processing unit 25, to the server 3 and the like. The terminal communication unit 21 may supply data received from the server 3 and the like, to the terminal processing unit 25. The terminal communication unit 21 may perform wireless communication by a wireless communication scheme of the IEEE802.11 standard, with an access point of Wireless Fidelity (Wi-Fi) (not illustrated).

The terminal storage unit 22 may include a semiconductor memory device, for example. The terminal storage unit 22 may store an operating system program, a driver program, an application program, data, and the like which may be used when the terminal processing unit 25 performs processing. For example, the terminal storage unit 22 may store an input device driver program for controlling the operating unit 23, an output device driver program for controlling the display unit 24, and the like, as the driver program. The terminal storage unit 22 may store a program and the like for acquiring and displaying display data regarding the progress of a game, as the application program. For example, the computer program may be installed on the terminal storage unit 22 from a computer-readable portable type recording medium such as a compact disk read only memory (CD-ROM) and a digital versatile disk read only memory (DVD-ROM), by using a well-known set-up program and the like. The terminal storage unit 22 may store a player ID which may be identification information of a user of the portable terminal 2, and display data, video data, image data and the like regarding the progress of a game, as the data. The terminal storage unit 22 may temporarily store temporary data regarding predetermined processing.

The operating unit 23 may be any device as long as the device enables an operation for the portable terminal 2. For example, a touch panel, a key button, and the like may be provided. A player can input a character, a number, a symbol, and the like by using the operating unit 23. If the operating unit 23 may be operated by a player, the operating unit 23 generates a signal corresponding to the operation. The generated signal may be supplied to the terminal processing unit 25 as an instruction of the player.

The display unit 24 may also be any device as long as the device enables display of a video, an image, and the like. For example, a liquid crystal display or an organic electro-luminescence (EL) device may be provided. The display unit 24 may display a video corresponding to video data supplied from the terminal processing unit 25 or may display an image and the like corresponding to image data supplied from the terminal processing unit 25.

The terminal processing unit 25 may include one or a plurality of processors and a peripheral circuit. The terminal processing unit 25 may be a central processing unit (CPU), for example. The terminal processing unit 25 may collectively control the overall operation of the portable terminal 2. The terminal processing unit 25 may control operations of the terminal communication unit 21, the display unit 24, and the like, based on the program stored in the terminal storage unit 22, an operation of the operating unit 23, and the like, such that various types of processing of the portable terminal 2 may be performed in appropriate procedures. The terminal processing unit 25 may perform processing based on the program (operating system program, driver program, application program, and the like) stored in the terminal storage unit 22. The terminal processing unit 25 can perform a plurality of programs (application programs and the like) in parallel.

2.1.1. Function of Terminal Processing Unit 25

FIGS. 3 and 4 are schematic diagrams illustrating a competition game which may be provided by the game system 1.

In the competition game, a competition may be executed between a plurality of groups to which a plurality of players belong. A competition combination for groups may be determined for a predetermined period. A player belonging to a group may perform a competition with a player belonging to the opponent group which may perform the competition, by using a character held by the player. A competition parameter such as attack power and defense power, and a parameter such as physical strength may be set for a character of each player. A player may cause the physical strength of the character to be consumed by a predetermined cost, which may thus allow one instance of a competition to be performed. The physical strength may be a parameter required for performing a competition. If the physical strength reaches 0, the player may not be able to execute the competition. A reference value may be predetermined in each competition parameter. A competition between players may be executed based on a correction value obtained by correcting the reference value of the competition parameter set for a character held by each of the players.

A point award, which may be determined based on the reference value set for a character of each player who performs a competition, may be assigned to a group to which the winning player in the competition belongs. In the following descriptions, the point award assigned to a group to which the winning player in the competition belongs may be referred to as a given point award.

For example, in a case where an attack correction value obtained by correcting an attack reference value of an offensive character used by a player who performs an attack is equal to or more than a defense correction value obtained by correcting a defense reference value of a defense-side character used by a player who is attacked, it may be determined that the player who has performed the attack wins. In a case where the attack correction value of the offensive character is less than the defense correction value of the defense-side character, it may be determined that the player who was attacked wins. In a case where the player who performed the attack wins, a given point award may be determined based on a difference value obtained by subtracting the defense reference value of the defense-side character from the attack reference value of the offensive character. The determined given point award may be assigned to the player who performed the attack. In a case where the player who was attacked wins, the given point award may be determined based on a difference value obtained by subtracting the attack reference value of the offensive character from the defense reference value of the defense-side character. The determined given point award may be assigned to the player who was attacked.

A center may be set for each group. The center functions as an attack target from a character of a player belonging to the other group. The player belonging to the group can cause the character to attack a center set for the opponent group. In a case where the center set for each group may be attacked, the attack correction value or the defense correction value which may be set for a character of each player belonging to the group may be reduced. However, the attack reference value or the defense reference value may not be changed.

FIGS. 3 and 4 illustrate an example in which a group A to which a player A1 and a player A2 belong, and a center A that may be set as an attack target, and a group B to which a player B1 belongs and a center B that may be set as an attack target perform a competition with each other. In this example, it may be assumed that, in an initial state in which the center may not be attacked, the correction value of each competition parameter may be the same as the reference value thereof. A given point award that may be assigned to group A in a case where a character A1 of the player A1 and a character A2 of the player A2 who belong to group A attack a character B1 of the player B1 belonging to group B will be described below.

FIG. 3 illustrates an initial state in which the center A and the center B have not been attacked. In the initial state, each of the attack reference value and the attack correction value of the character A1 may be [100], each of the attack reference value and the attack correction value of the character A2 may be [200], and each of the defense reference value and the defense correction value of the character B1 may be [150]. In this state, in a case where the character A1 attacks the character B1, the player A1 may lose because the attack correction value [100] of the character A1 is less than the defense correction value [150] of the character B1. A given point may not be assigned to the player A1. In a case where the character A2 attacks the character B1, the player A2 wins because the attack correction value [200] of the character A2 may be equal to or more than the defense correction value [150] of the character B1. In this case, the given point assigned to the player A2 may have a value [250]. The value [250] may be obtained by subtracting a value [50] which may be obtained by subtracting the defense reference value [150] of the character B1 from the attack reference value [200] of the character A2, from a predetermined value [300].

FIG. 4 illustrates a state in which the center B has been attacked by the character A1 of the player A1 belonging to the group A. In this state, the defense reference value of the character B1 of the player B1 belonging to the group B which may have the attacked center B may be [150] and may not be changed. However, the defense correction value thereof may be reduced to be [50]. In this state, in a case where the character A1 attacks the character B1, the player A1 may win because the attack correction value [100] of the character A1 may be equal to or more than the defense correction value [50] of the character B1. In this case, the given point assigned to the player A1 may have a value [350]. The value [350] may be obtained by subtracting a value [−50] which may be obtained by subtracting the defense reference value [150] of the character B1 from the attack reference value [100] of the character A1, from a predetermined value [300].

In a case where the character A2 attacks the character B1, the player A2 may win because the attack correction value [200] of the character A2 may be equal to or more than the defense correction value [50] of the character B1. The defense reference value of the character B1 in this case may be the same as the defense reference value of the character B1 in the initial state. Thus, the given point assigned to the player A2 may have a value [250] which may be the same as the given point assigned in a case where the player A2 wins in the initial state.

Similarly, in a case where the center A may be attacked by the character B1 of the player B1 belonging to the group B, the attack reference values of the characters A1 and A2 of the players A1 and A2 who belong to the group A having the attacked center A may be not changed, and the attack correction values thereof may be changed (reduced).

In a case where the center B may be attacked, instead of or in addition to changing (reducing) of the defense correction value of the character B1 of the player B1 belonging to the group B of which the center B may be attacked, the attack correction values of the characters A1 and A2 of the players A1 and A2 who belong to the group A which attacks the center B may be changed (increased). Similarly, in a case where the center A may be attacked, instead of or in addition to changing (reducing) of the attack correction values of the characters A1 and A2 of the players A1 and A2 belonging to the group A of which the center A may be attacked, the defense correction value of the character B1 of the player B1 who belong to the group B which attacks the center A may be changed (increased). In these cases, it may also be possible to improve strategic characteristics for obtaining a point in the competition game.

The given point award may have a value obtained in the following manner. A value may be obtained by subtracting the defense reference value of a character of the losing player, from the attack reference value of a character of the winning player. A value may be obtained by multiplying a predetermined coefficient by the value obtained by this subtraction operation. The value for the given point award may be a value obtained by subtracting the value obtained by the multiplication, from a predetermined value. In this case, the predetermined coefficient may vary depending on a relation between correction values of characters of players who may have performed a competition. For example, the predetermined coefficient, in a case where the attack correction value of a character of the winning player is less than the defense correction value of a character of the losing player, may be more than the predetermined coefficient in a case where the attack correction value of a character of the winning player is equal to or more than the defense correction value of a character of the losing player. Thus, each player gets to actively attack a player who may be stronger than himself/herself. Accordingly, it may be possible to achieve vitalization of the competition game.

For example, the predetermined coefficient in a case where the attack correction value of a character of the winning player is less than the defense correction value of a character of the losing player may be [2], and the predetermined coefficient in a case where the attack correction value of a character of the winning player is equal to or more than the defense correction value of a character of the losing player may be [0.5]. In this case, in the example illustrated in FIG. 4, a value [25] may be obtained by multiplying a value [50] obtained by subtracting the defense reference value [150] of the character B1 from the attack reference value [200] of the character A2, by the predetermined coefficient [0.5], and a value [275] obtained by subtracting the obtained value [25] from the predetermined value [300] may be set in the given point award assigned to the player A2. A value [−50] may be obtained by subtracting the defense reference value [150] of the character B1 from the attack reference value [100] of the character A1. A value [−100] may be obtained by multiplying the value [−50] by the predetermined coefficient [2]. Then, a value [400] obtained by subtracting the obtained value [−100] from the predetermined value [300] may be set in the given point award assigned to the player A1.

In this manner, in the initial state, that is, when a competition between groups starts, the reference value and the correction value of each character may be set to be the same value as each other. After that, if a center for each group may be attacked, the reference value may not be changed, and only the correction value may be changed. Thus, a player may cause the character to attack the center set for the opponent group, and thus can win the opponent player whom winning may not be possible in the initial state. In this case, since the reference value used for calculating a given point award may not be changed, the given point award assigned to the winning player may have the same value as the given point award assigned in the initial state. In this example, since the given point award may be determined based on a difference value obtained by subtracting the attack reference value of a character which may perform an attack, from the defense reference value of a character which may be attacked, the player A1 having a smaller attack reference value of the character can acquire a given point award higher than that assigned to the player A2 having a large attack reference value of the character.

In this manner, a player may perform a predetermined action on a predetermined game content of the opponent group, and thus can change the correction value of a competition parameter provided for the character of a player belonging to the opponent group. Thus, a player may cause the character to attack a center set for the opponent group, and thus can improve a probability of winning the opponent player who uses a character having a large reference value, and can acquire a higher given point award. Thus, in a competition game, it may be possible to improve strategic characteristics and to maintain the will of a player to continue the game.

Each player discusses about a timing for attacking a center of the opponent group, a player who attack a center, a target center to be attacked by the player, and the like, with other players belonging to the same group and cooperates with each other, and thus it may be possible to acquire a given point award with higher efficiency. Thus, it may be possible to achieve vitalization of communication between players in the competition game.

Figure 5A:
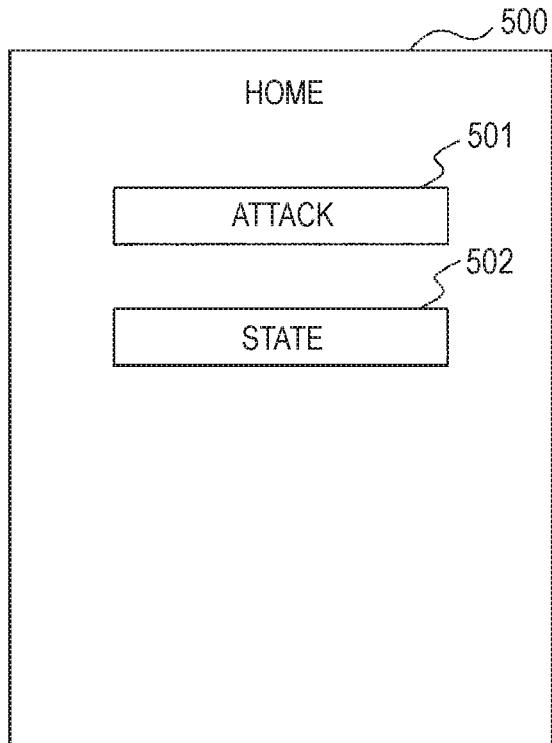
FIG. 5A is a diagram illustrating an example of a display screen in the portable terminal.

FIG. 5A is a diagram illustrating an example of a home screen displayed in the display unit 24.

A home screen 500 illustrated in FIG. 5A may be displayed when the game starts, for example. Each screen which will be described below may be displayed based on display data which may have been received from the server 3. In the following descriptions, a player of the portable terminal 2 in which each screen may be displayed may be referred to as an execution player.

An attack button 501, a status button 502, and the like may be displayed on the home screen 500. If the attack button 501 is pressed, an attack selection screen for selecting a player as a target of an attack may be displayed. If the status button 502 is pressed, a state screen for displaying a status of a competition in the middle of being executed may be displayed.

Figure 5B:
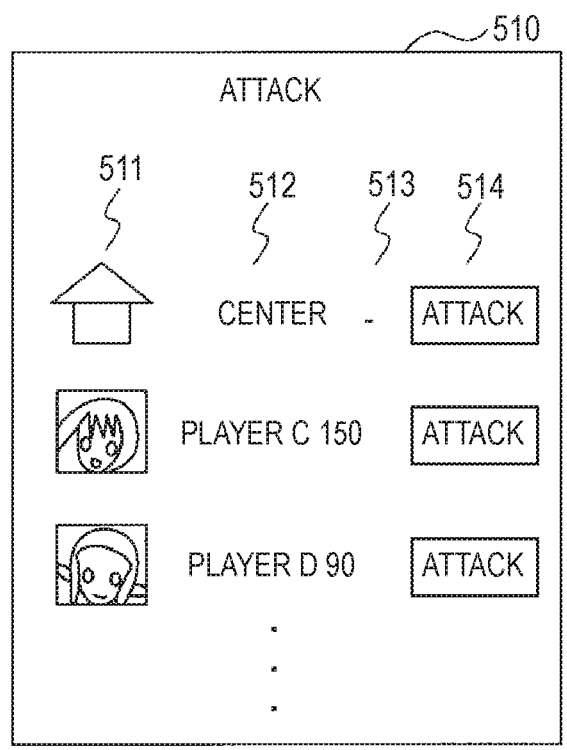
FIG. 5B is a diagram illustrating an example of a display screen in the portable terminal.

FIG. 5B is a diagram illustrating an example of the attack selection screen displayed in the display unit 24.

An attack selection screen 510 illustrated in FIG. 5B may be displayed when the attack button 501 is pressed on the home screen 500. A list of attack targets in the opponent group with which a competition may be performed, that is, a list of a center set for the opponent group and players belonging to the opponent group may be displayed on the attack selection screen 510. An image (image of a center or avatar image of each player) 511, the name (center name or player name) 512, defense power 513, an attack button 514, and the like may be displayed for each attack target, on the attack selection screen 510.

The defense correction value of a character of each player may be displayed as the defense power 513. Instead of or in addition to the defense correction value of a character of each player, the defense reference value may be displayed as the defense power 513. The attack button 514 may be displayed so as to enable selection of an attack target (center or player). If the attack button 514 is pressed, an attack to an attack target corresponding to the pressed attack button 514 may be performed, and a result screen for displaying a result thereof may be displayed.

Figure 5C:
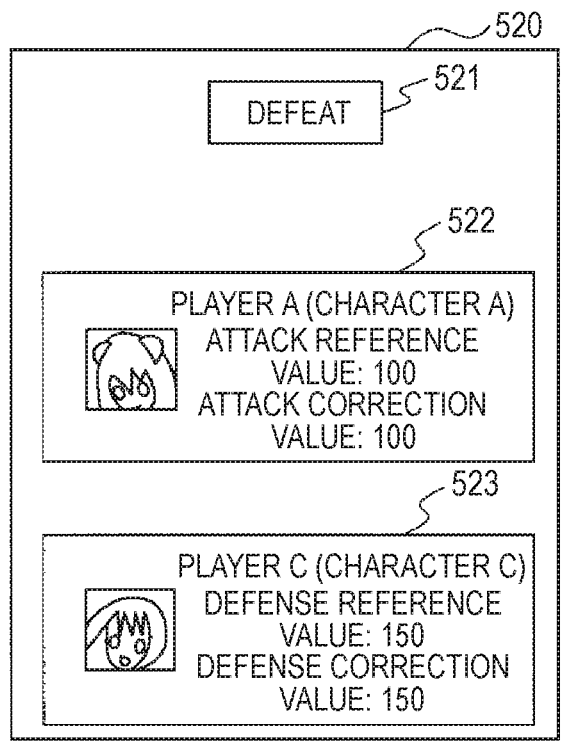
FIG. 5C is a diagram illustrating an example of a display screen in the portable terminal.

FIG. 5C is a diagram illustrating an example of the result screen displayed in the display unit 24.

A result screen 520 illustrated in FIG. 5C may be displayed in a case where the attack button 514 is pressed on the attack selection screen 510 so as to perform an attack, and the execution player loses. A competition result 521, information 522 regarding the execution player, information 523 regarding the opponent player who may perform a competition, and the like may be displayed on the result screen 520.

A message indicating defeat in the competition may be displayed as the competition result 521 on the result screen 520. The information 522 regarding the execution player may include a player name, the attack reference value and the attack correction value of a character to be used. The information 523 regarding the opponent player may include a player name, the defense reference value, and the defense correction value of a character to be used. As will be described later, in a case where points may be lost by a player losing in a competition, the lost points may be further displayed on the result screen 520.

Figure 5D:
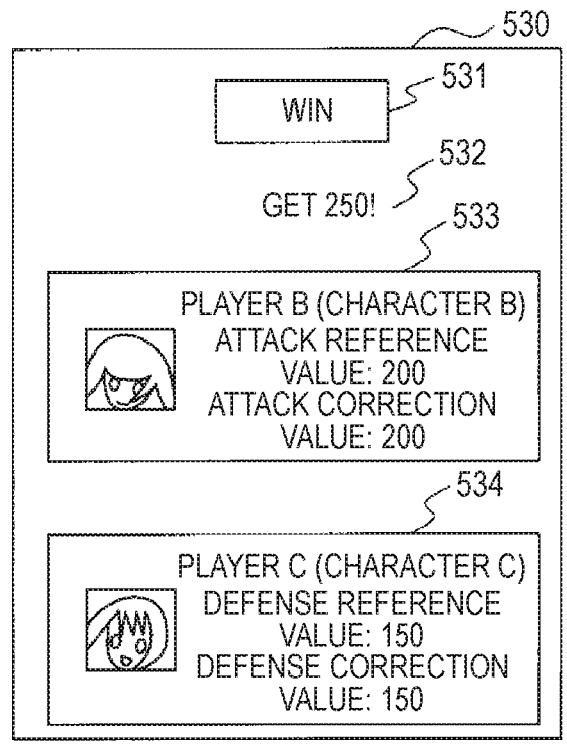
FIG. 5D is a diagram illustrating an example of a display screen in the portable terminal.

FIG. 5D may be a diagram illustrating another example of the result screen displayed in the display unit 24.

The result screen 530 illustrated in FIG. 5D may be displayed in a case where the attack button 514 is pressed on the attack selection screen 510, and thus an attack may be performed, and the execution player loses. A competition result 531, a given point award 532, information 533 regarding the execution player, information 534 regarding the opponent player, and the like may be displayed on the result screen 530. A message of winning in the competition may be displayed as the competition result 531, on the result screen 530. The given point award 532 may indicate a given point award assigned by the competition. Other types of information may be similar to those of information displayed on the result screen 520.

Figure 6A:
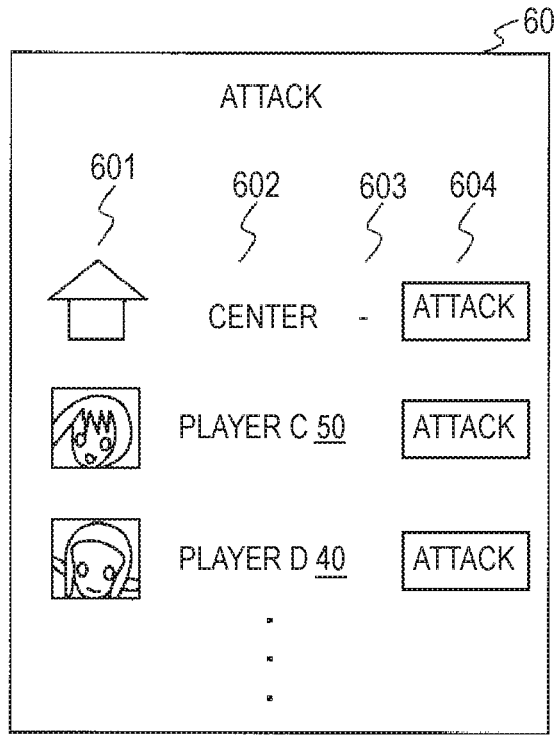
FIG. 6A is a diagram illustrating another example of the display screen in the portable terminal.

FIG. 6A is a diagram illustrating another example of the attack selection screen displayed in the display unit 24.

An attack selection screen 600 illustrated in FIG. 6A may be an example of the attack selection screen in a case where a center of the opponent group is attacked by a character of a player belonging to a group to which the execution player belongs. Similarly to that in the attack selection screen 510, a list of attack targets in the opponent group may be displayed on the attack selection screen 600. In addition, an image 601, a name 602, defense power 603, an attack button 604, and the like may be displayed for each of the attack target, on the attack selection screen 600. The defense correction value after correction of a character of each player may be displayed as the defense power 603 on the attack selection screen 600, and the display may be performed so as to enable recognition of being corrected (for example, underline display, boldface display, and red display).

In a case where the center of the opponent group may be attacked, similarly to that on the result screen 520 or 530, the defense correction value may be displayed so as to enable recognition of being corrected (for example, underline display, boldface display, and red display).

Figure 6B:
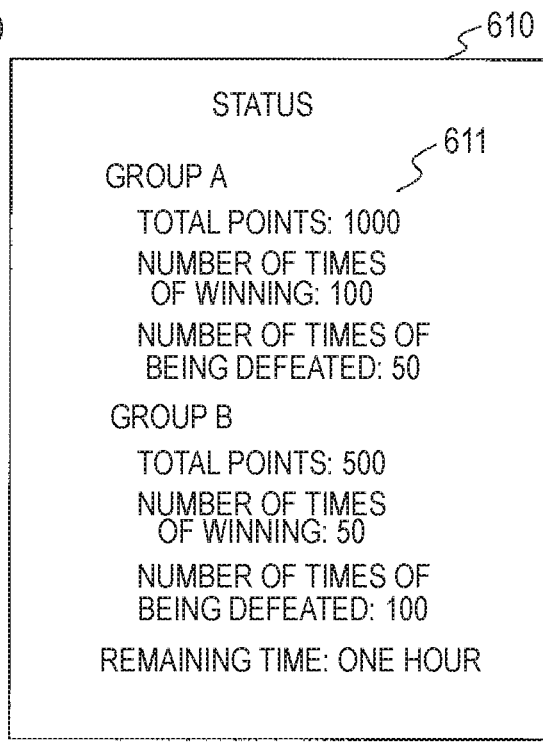
FIG. 6B is a diagram illustrating another example of the display screen in the portable terminal.

FIG. 6B is a diagram illustrating an example of a state screen displayed in the display unit 24.

A state screen 610 illustrated in FIG. 6B may be displayed when the status button 502 may be pressed on the home screen 500. A group to which the execution player belongs, a status 611 of the opponent group to which the opponent player belongs, and the like may be displayed on the state screen 610.

A group name, the total points awarded, the number of times the group has won, the number of times the group has lost, the remaining time, and the like may be displayed on the status 611. The total points corresponds to the summation of given point awards which may be assigned by players belonging to each group. The number of times the group has won corresponds to the summation of the number of times of that players belonging to each group have won against players belonging to the opponent group. The number of times the group has lost corresponds to the summation of the number of times of that players belonging to each group have lost against players belonging to the opponent group. The remaining time corresponds to the remaining time of a competition event.

2.1.2. Configuration of Terminal Processing Unit 25

The terminal processing unit 25 may include at least a browsing execution unit 251. The browsing execution unit 251 may be a functional module realized by a program which may be executed by a processor included in the terminal processing unit 25. In addition, the browsing execution unit 251 may be mounted as a firmware in the portable terminal 2.

The browsing execution unit 251 may acquire and may display display data regarding the progress of a game. That is, the browsing execution unit 251 may transmit an acquire request of display data regarding the progress of the game, to the server 3 through the terminal communication unit 21, in accordance with an instruction from a player. The browsing execution unit 251 may receive the corresponding display data from the server 3 through the terminal communication unit 21. The browsing execution unit 251 may create drawing data based on the received display data. That is, the browsing execution unit 251 may interpret the received display data, so as to specify control data and content data. The browsing execution unit 251 may perform layout of the content data which may be similarly specified, based on the specified control data, and may create drawing data. The browsing execution unit 251 may output the created drawing data to the display unit 24. The browsing execution unit 251 may store pieces of information included in the display data, in the terminal storage unit 22 during a period when a communication connection with the server 3 may be established.

2.2. Configuration of Server 3

Figure 7:
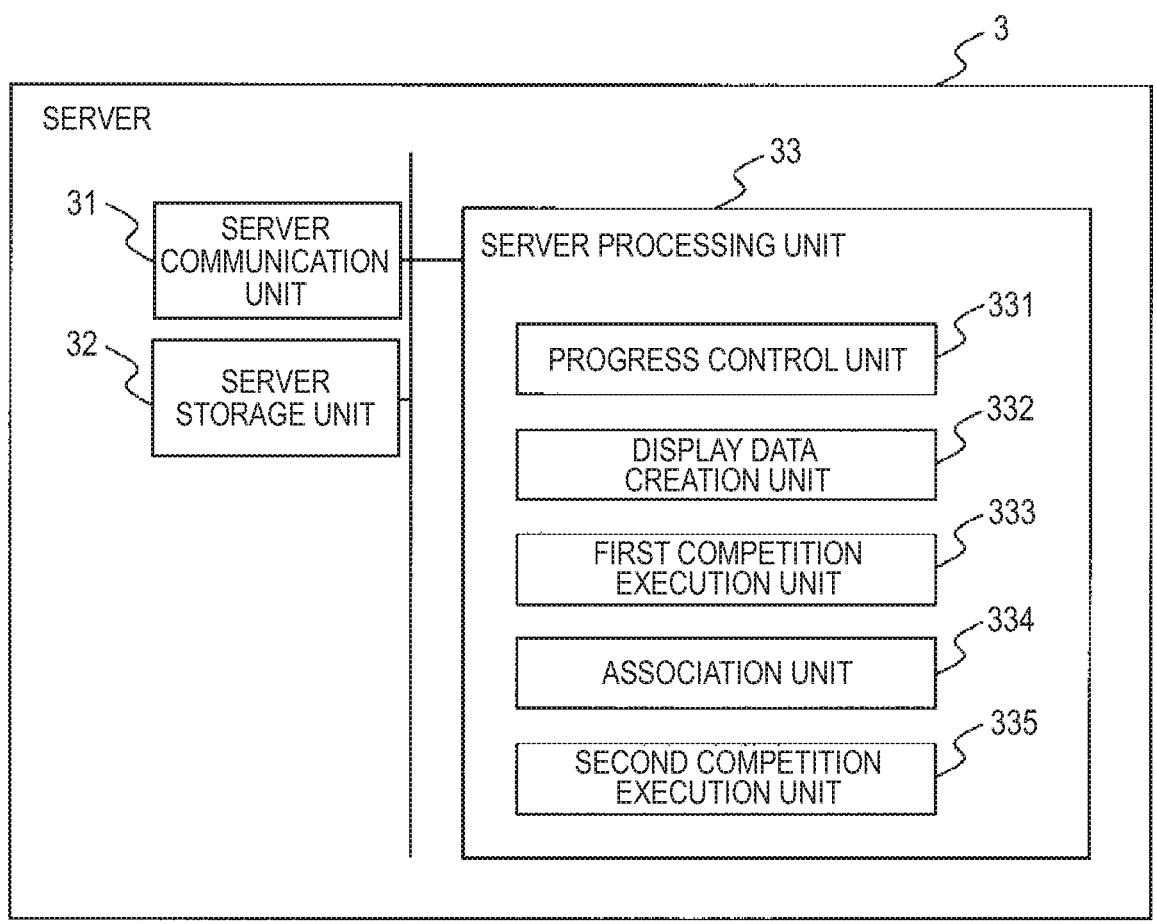
FIG. 7 is a diagram illustrating an example of a schematic configuration of a server.

FIG. 7 may be a diagram illustrating an example of a schematic configuration of the server 3. FIGS. 8A and 8B are diagrams illustrating an example of data structures of various tables stored in a server storage unit 32.

The server 3 may include a server communication unit 31, the server storage unit 32, and a server processing unit 33. The server 3 may cause the game to proceed, in accordance with a request from the portable terminal 2. The server 3 may create display data regarding the progress of the game, and may transmit the created display data to the portable terminal 2.

The server communication unit 31 may be an example of an output unit. The server communication unit 31 may include a communication interface circuit for connecting the server 3 to the Internet 7, and thus may perform communication with the Internet 7. The server communication unit 31 may supply data which may have been received from the portable terminal 2 and the like, to the server processing unit 33. The server communication unit 31 may transmit data supplied from the server processing unit 33, to the portable terminal 2 and the like.

The server storage unit 32 may include at least one of a magnetic tape device, a magnetic disk device, and an optical disk device, for example. The server storage unit 32 may store an operating system program, a driver program, an application program, data, and the like which may be used in processing in the server processing unit 33. For example, the server storage unit 32 may store a game program and the like of causing the game to proceed and creating display data regarding a result, as the application program. For example, the computer program may be installed on the terminal storage unit 22 from a computer-readable portable type recording medium such as a CD-ROM and a DVD-ROM, by using a well-known set-up program and the like.

The server storage unit 32 may store a player table illustrated in FIG. 8A, a group table illustrated in FIG. 8B, and the like, as the data. Further, the server storage unit 32 may temporarily store temporary data regarding predetermined processing.

FIG. 8A illustrates a player table for managing a player. Pieces of information such as an identification number (player ID), a password, and the name of the player, a file name of an avatar image, an owned item ID, a competition parameter, physical strength, the total point, and a group ID may be stored in the player table. The above pieces of information may be stored in association with each player.

The owned item ID corresponds to identification information of each item owned by the player. The item owned by a player may include items such as a weapon and a recovery potion, which may be used in a competition by the player. The reference value of each competition parameter provided for a character of each player may be stored as the competition parameter. The reference value of each competition parameter may be updated, for example, so as to be increased in a case where a player performs a competition with another player, and the player wins. The total point corresponds to the summation of given point awards which may be assigned to the group to which an execution player belongs, by the execution player.

In this manner, the reference value of the competition parameter may be stored in the player table, for each of a plurality of players. "The reference value of the competition parameter being stored for each of a plurality of players" means that the reference value of the competition parameter provided for a character of a player may be stored in association with the player. The reference value of the competition parameter, which may be stored in association with a player may be simply described as "the reference value of a player". The correction value obtained by correcting the reference value which may be stored in association with a player may be simply described as "the correction value of a player".

FIG. 8B illustrates a group table for managing a group into which players may be classified. An identification number (group ID) of a group, a belonging player ID, an identification number (center ID) and the name (center name) of a center, a file name of a center image, an opponent group ID, the number of times of the center being attacked, the total point, and the like may be stored in the group table, in association with each group.

The belonging player ID may be a player ID of a player belonging to the group. The center ID may be an identification number of a center set for the group. The opponent group ID may be a group ID of the opponent group in the middle of a competition. A competition combination for groups may be determined for a predetermined period. The group ID of the opponent group may be updated when the competition combination is determined. The number of times of the center being attacked corresponds to the number of times that the center has been attacked by a character of a player belonging to the opponent group. The total points correspond to the summation of given point awards which may be assigned to each group by a player who belongs to the group performing a competition.

2.2.1. Configuration of Server Processing Unit 33

The server processing unit 33 may include a progress control unit 331, a display data creation unit 332, a first competition execution unit 333, an association unit 334, a second competition execution unit 335, and the like. The above units may be functional modules realized by a program which may be executed by a processor included in the server processing unit 33. In addition, the above units may be mounted as a firmware in the server 3.

The progress control unit 331 may control a start and progress of a game, and may appropriately instruct the first competition execution unit 333, the association unit 334, and the second competition execution unit 335 to perform processing. The progress control unit 331 may transmit and may receive required data to and from the portable terminal 2 through the server communication unit 31.

If a request of each of the screens which may be described with reference to FIGS. 4A to 5B is received from the portable terminal 2, the progress control unit 331 may create display data for displaying a button (for receiving an instruction from the player), character information (of which the player may be notified), an image, and the like in a layout in accordance with the corresponding screen. The progress control unit 331 may instruct the corresponding units to create the display data. The progress control unit 331 may transmit the created display data to the portable terminal 2. If a certain button is pressed on a screen displayed in the portable terminal 2, and a request of the next screen, which corresponds to the button may be received from the portable terminal 2, the progress control unit 331 similarly may create display data of the next screen or may instruct the units of the creation. The progress control unit 331 may transmit the created display data to the portable terminal 2.

In particular, in a case where an operation for starting the game or an operation for transitioning to the home screen is performed by the player with the portable terminal 2, and a home screen request corresponding to the operation is received from the portable terminal 2, the progress control unit 331 may instruct the display data creation unit 332 to create display data for displaying the home screen 500. The progress control unit 331 may transmit the display data which may have been created by the display data creation unit 332, to the portable terminal 2.

In a case where the status button 502 is pressed on the home screen 500 displayed in the portable terminal 2, the progress control unit 331 may instruct the display data creation unit 332 to create display data for displaying the state screen 610. The progress control unit 331 may transmit the display data which may have been created by the display data creation unit 332, to the portable terminal 2.

In a case where the attack button 501 is pressed on the home screen 500 displayed in the portable terminal 2, and an attack selection screen request corresponding to the pressing is received, the progress control unit 331 may instruct the display data creation unit 332 to create display data for displaying the attack selection screens 510 and 600. The progress control unit 331 may transmit the display data, which has been created by the display data creation unit 332, to the portable terminal 2. The attack selection screen request may include the player ID of an execution player.

In a case where the attack buttons 514 and 604 are respectively pressed on the attack selection screens 510 and 600 displayed in the portable terminal 2, and a competition request corresponding to the pressing is received from the portable terminal 2, the progress control unit 331 may instruct the first competition execution unit 333 to execute a competition. The progress control unit 331 may transmit display data, which has been created by the association unit 334 and may be used for displaying the result screen 520 or 530, to the portable terminal 2. The competition request may include the player ID of an execution player, and information regarding whether the occurring attack is an attack to a character of the opponent player or an attack to the center. In addition, the competition request may further include the player ID of the opponent player in a case where the occurring attack is an attack to the character of the opponent player.

In a case where an instruction of creating display data for displaying each of the screen is received from the progress control unit 331, the display data creation unit 332 may create display data of which an instruction may be performed, for displaying a screen. The display data creation unit 332 may send the created display data to the progress control unit 331.

In particular, in a case where an instruction of creating display data for displaying the attack selection screens 510 and 600 is received from the progress control unit 331, the display data creation unit 332 may specify the player ID of an execution player, which may be included in the attack selection screen request, and may extract a group ID corresponding to the player ID of the execution player, from the player table. The display data creation unit 332 may specify an opponent group ID corresponding to the extracted group ID, from the group table. The display data creation unit 332 may extract a center ID, the center name, a center image, the number of times of the center being attacked, and the belonging player ID of the opponent group corresponding to the specified opponent group ID. The display data creation unit 332 may further extract the player name, an avatar image, and a competition parameter (defense reference value) corresponding to the extracted belonging player ID, from the player table.

The display data creation unit 332 may calculate a defense correction value obtained by correcting the defense reference value, based on the number of times of the center being attacked. The display data creation unit 332 may calculate the defense correction value in a manner similar to that of a method in which the first competition execution unit 333 may perform calculation in processing which will be described later. The display data creation unit 332 may create display data of the attack selection screens 510 and 600, based on the extracted or calculated information. The display data creation unit 332 may send the created display data to the progress control unit 331.

In a case where an instruction of performing a competition is received from the progress control unit 331, the first competition execution unit 333 may read information included in the competition request, and determines whether the occurring attack is an attack to a character of the opponent player or an attack to a center.

In a case where the occurring attack is an attack to the center, the first competition execution unit 333 may specify the player ID of an execution player, which may be included in the competition request. The first competition execution unit 333 may extract a competition parameter (attack reference value of the character of the execution player) and a group ID corresponding to the specified player ID of the execution player, from the player table. The first competition execution unit 333 may specify an opponent group ID corresponding to the extracted group ID, from the group table. The first competition execution unit 333 may increment (+1) count of the number of times that the center has been attacked corresponding to the specified opponent group ID. As described above, the count of the number of times of the center has been attacked corresponds to the number of times the center is attacked by a character of a player belonging to the opponent group. In this manner, the first competition execution unit 333 changes the number of times that the center has been attacked, in a case where an attack to the center of the opponent group to which the opponent player belongs may be executed. As will be described later, a correction value obtained by correcting the reference value of the competition parameter of a character of each of players who belongs to each group and/or another group which may perform a competition with the group may be calculated based on the number of times of the center being attacked, for each group. The competition may be executed by using the calculated correction value.

The first competition execution unit 333 may set defense power for each center. Specifically, in a case where attack power (attack reference value or attack correction value) of a character of the execution player is equal to or larger than the defense power, the first competition execution unit 333 may determine that the attack to the center succeeds, and may increment the number of times of the center being attacked. The first competition execution unit 333 may further set HP (hit point) for each center. In a case where the attack power of a character of each execution player is equal to or larger than the defense power of the center, the first competition execution unit 333 may decrease the HP of the center. In a case where the HP of the center reaches 0, the first competition execution unit 333 may determine that the attack to the center succeeds, and may increment the number of times of the center being attacked.

The first competition execution unit 333 may decrease the number of times of the center being attacked with the time elapsed from when the center is attacked. In this case, the first competition execution unit 333 may store an attack time point when an attack occurs, in the group table whenever the center is attacked. The first competition execution unit 333 may monitor the attack time point for each attack to the center. In a case where a predetermined period (for example, 10 minutes) elapses from the stored attack time point, the first competition execution unit 333 may decrement the number of times of the center being attacked. As will be described later, a correction value of each competition parameter of a character of each of players who belongs to each group and/or another group which may perform a competition with the group may be calculated based on the number of times of the center being attacked, for each group. Thus, the first competition execution unit 333 may decrease the number of times of the center being attacked with the time elapsed from when the center may be attacked, and thus may restore each correction value of a character of each player.

In a case where a predetermined reset condition is satisfied, the first competition execution unit 333 may reset the number of times of the center being attacked. As the predetermined reset condition, for example, a case where a predetermined period elapses from when the center is finally (or firstly) attacked, a case where the number of times of the center being attacked is equal to or more than a predetermined value, and a combination of the cases may be provided.

For example, the first competition execution unit 333 may store an attack time point when an attack occurs, in the group table whenever the center is attacked. In a case where a predetermined period elapses from the latest (or oldest) attack time point which has been stored, the first competition execution unit 333 may reset the number of times of the center being attacked to be 0. In this case, the first competition execution unit 333 may reset each correction value of a character of each player, with the time elapsed from when the center may be attacked.

The first competition execution unit 333 may change a period until the number of times of the center being attacked is reset, in accordance with the current number of times of the center being attacked. For example, the first competition execution unit 333 may reduce the period until the number of times of the center being attacked is reset, as the current number of times of the center being attacked becomes more. For example, in a case where the current number of times of the center being attacked is one time, the first competition execution unit 333 may set the period until the number of times of the center being attacked is reset, to be 10 minutes. In a case where the current number of times of the center being attacked is ten times, the first competition execution unit 333 may set the period until the number of times of the center being attacked is reset, to be one minute. Thus, since each player selects any of a strategy of intensively executing an attack for a short term, and a strategy of executing an attack for a long term, it may be possible to improve the strategic characteristics of a competition game. Each player may form a coalition between players in the group, in order to select and execute a desired strategy. Thus, it may be possible to better encourage communication between players.

Thus, each player may set an attack to a character of the opponent player to be performed for a short term or within a predetermined period after the player causes the character to attack a center. Accordingly, it may be possible to vitalize a competition game. Each player sets an attack to a center to be periodically executed, in order to continuously reduce the correction value of the character of the opponent player or to continuously increase the correction value of the own character. Thus, it may be possible to vitalize a competition game.

In a case where the occurring attack is an attack to the character of the opponent player, the first competition execution unit 333 may specify player IDs of an execution player and the opponent player, which may be included in the competition request. The first competition execution unit 333 may extract a competition parameter (attack reference value of the character of the execution player and defense reference value of the character of the opponent player) and a group ID corresponding to the specified player ID of each of the players, from the player table. The first competition execution unit 333 may extract the number of times of the center being attacked corresponding to the extracted group ID, from the group table.

The first competition execution unit 333 may calculate the correction value obtained by correcting the reference value of the competition parameter of the character of a player, based on the number of times of the center being attacked, of each group to which the players belong.

The first competition execution unit 333 may calculate the defense correction value in the following manner. In a case where the number of times the center has been attacked by a group to which the opponent player belongs is 0, the first competition execution unit 333 may set the defense correction value of the character of the opponent player to be the same value as the defense reference value. The first competition execution unit 333 may reduce the defense correction value as the number of times of the center being attacked becomes more. For example, the first competition execution unit 333 may calculate a value obtained by subtracting a value which may be obtained by multiplying the number of times of the center being attacked and a predetermined coefficient (for example, 0.1) by the defense reference value, from the defense reference value, as the defense correction value. In a case where the number of times of the center being attacked is equal to or more than one time, the first competition execution unit 333 may calculate the defense correction value so as to be a constant value. In this case, the first competition execution unit 333 may calculate a value obtained by subtracting a value which may be obtained by multiplying the predetermined coefficient by the defense reference value, from the defense reference value, as the defense correction value.

Similarly, the first competition execution unit 333 may calculate the attack correction value in the following manner. In a case where the number of times the center has been attacked by a group to which the execution player belongs is 0, the first competition execution unit 333 may set the attack correction value of the character of the execution player to be the same value as the attack reference value. The first competition execution unit 333 may reduce the attack correction value as the number of times of the center being attacked becomes more.

The first competition execution unit 333 may calculate the correction value of the competition parameter of the character of a player, based on the number of times the center has been attacked by the opponent group with which the player executes a competition. Alternatively or in addition, the first competition execution unit 333 may calculate the correction value of the competition parameter of the character of a player, based on the number of times the center has been attacked by a group to which the player belongs. In this case, the first competition execution unit 333 may calculate the attack correction value in the following manner. In a case where the number of times the center the center has been attacked by a group to which the opponent player belongs is 0, the first competition execution unit 333 may set the attack correction value of the character of the execution player to be the same value as the attack reference value. The first competition execution unit 333 may increase the attack correction value as the number of times of the center being attacked becomes more. Similarly, the first competition execution unit 333 may calculate the attack correction value in the following manner. In a case where the number of times of the center being attacked, of a group to which the execution player belongs may be 0, the first competition execution unit 333 may set the defense correction value of the character of the opponent player to be the same value as the defense reference value. The first competition execution unit 333 may increase the defense correction value as the number of times of the center being attacked becomes more.

The first competition execution unit 333 may not correct the attack reference value of the character of the execution player or the defense reference value of the character of the opponent player, regardless of the number of times of the center being attacked, of a group to which a player belongs. As described above, the first competition execution unit 333 may perform control to change each of the correction values of characters of the execution player and/or the opponent player and not to change each of the reference values, based on the number of times the center has been attacked by a group to which the execution player and/or the opponent player belongs. That is, in a case where an attack to the center of a group to which the execution player and/or the opponent player belongs may be executed, the first competition execution unit 333 may perform control to change each of the correction values of the characters of the execution player and/or the opponent player, and not to change each of the reference values thereof.

"The control not to change the reference value" simply means that "processing for changing the reference value may not be performed", and may not mean that "even though a command to perform processing for changing the reference value may be issued, the command may not be accepted".

As described above, the first competition execution unit 333 may decrease the number of times the center has been attacked with the time elapsed from when the center is attacked. Thus, the first competition execution unit 333 may reduce the correction value of the character of each player whenever an attack to the center may be executed. The first competition execution unit 333 restores the correction value with the time elapsed.

The first competition execution unit 333 may not correct the attack correction value of the character of the execution player, and may use the attack reference value as the attack correction value, regardless of the number of times of the center being attacked, of a group to which the execution player and/or the opponent player belongs. Similarly, the first competition execution unit 333 may not correct the defense correction value of the character of the opponent player, and may use the defense reference value as the defense correction value, regardless of the number of times of the center being attacked, of a group to which the execution player and/or the opponent player belongs.

The first competition execution unit 333 may change the correction value in accordance with the number of times that a specific player belonging to one group consecutively wins against players belonging to the other group. For example, the first competition execution unit 333 associates the number of times of that a player consecutively wins against players belonging to the opponent group, with the player, and may store a result of the association in the player table. The first competition execution unit 333 may change the correction value so as to increase the attack correction value of the character of an execution player and/or to reduce the defense correction value of the character of the opponent player, as the number of times of that the execution player has consecutively won against players belonging to the opponent group increases. A player may consecutively win against each of the players belonging to the opponent group, and thus can win against a player who may be stronger than himself/herself. Thus, it may be possible to improve the strategic characteristics of a competition game.

The first competition execution unit 333 may change the correction value so as to reduce the attack correction value of the character of an execution player and/or to increase the defense correction value of the character of the opponent player, as the number of times of that the execution player consecutively wins against players belonging to the opponent group becomes more. In this case, it may be possible to suppress an occurrence of a situation where the execution player excessively consecutively wins, the opponent player becomes weak, and thus game balance is damaged.

The first competition execution unit 333 may change the correction value in accordance with the number of times of that a plurality of players belonging to one group alternately win players belonging to the other group. For example, the first competition execution unit 333 may associate the number of times of that players belonging to one group alternately win against players belonging to the opponent group, with each group, and may store a result of the association in the group table. The first competition execution unit 333 may change the correction value so as to increase the attack correction value of the character of an execution player and/or to reduce the defense correction value of the character of the opponent player, as the number of times of that players belonging to one group to which the execution player belongs alternately win against players belonging to the opponent group increases. Each player cooperates with a player belonging to the same group, and thus can win against a player which may be stronger than himself/herself. Thus, it may be possible to improve communication between players and to improve strategic characteristics in a competition game.

In addition, the first competition execution unit 333 may change the correction value so as to reduce the attack correction value of the character of an execution player and/or to increase the defense correction value of the character of the opponent player, as the number of times that players belonging to one group to which the execution player belongs have alternately won against players belonging to the opponent group increases. In this case, it may be possible to suppress an occurrence of a situation where the number of times of alternately winning may be too large, the opponent player becomes weak, and thus game balance is damaged.

The first competition execution unit 333 may calculate the correction value of the competition parameter of the character of a player, in accordance with a parameter such as the HP set for the center, instead of the number of times of the center being attacked. In this case, for example, the first competition execution unit 333 may change the correction value so as to reduce the correction value as the HP set for the center becomes smaller.

The first competition execution unit 333 may execute a competition between an execution player and the opponent player, based on the calculated attack correction value of the character of the execution player and the calculated defense correction value of the character of the opponent player. For example, the first competition execution unit 333 may determine that the execution player wins, in a case where the attack correction value of the character of the execution player is equal to or more than the defense correction value of the character of the opponent player. The first competition execution unit 333 may determine that the opponent player wins, in a case where the attack correction value of the character of the execution player is less than the defense correction value of the character of the opponent player.

As described above, the first competition execution unit 333 may execute a competition between two players, based on the correction value obtained by correcting the reference value of the character of at least one player of the two players who respectively belong to two groups in a plurality of groups.

The association unit 334 may determine the given point award based on the attack reference value of the character of the execution player and the defense reference value of the character of the opponent player. The association unit 334 assigns the determined given point award to a group to which the winning player belongs. The association unit 334 assigns the given point award in a manner that the association unit 334 adds the given point award to the total points associated with the winning player, and thus may store the given point award in the player table, in association with the winning player. The association unit 334 may assign the given point award in such a manner that the association unit 334 adds the given point award to the total points associated with a group to which the winning player belongs, and thus may store the given point award in the group table, in association with the group to which the winning player belongs. The association unit 334 may determine a deprivation point score based on a competition result, and may reduce the points of a group to which the losing player belongs by the deprivation point score.

In this manner, the association unit 334 may assign the given point award to a group to which the opponent player belongs, in a case where the execution player loses. Even in a case where a player on a side of being attacked wins, the given point award may be assigned. Thus, a player who performs an attack and loses may get to more actively perform an attack, so as to recover a loss occurring in the group to which the player himself/herself belongs. Accordingly, it may be possible to achieve vitalization of a competition game.

The association unit 334 may determine the given point award so as to be increased as the reference value of the character of the winning player becomes smaller, and to be increased as the reference value of the character of the losing player becomes larger. For example, the association unit 334 may determine the given point award so as to be increased as a value obtained by subtracting the reference value of the character of the losing player, from the reference value of the character of the winning player, becomes smaller. That is, the association unit 334 may set the given point award assigned in a case where the reference value of the character of the winning player may be less than the reference value of the character of the losing player, to be larger than the given point award assigned in a case where the reference value of the character of the winning player is equal to or more than the reference value of the character of the losing player. Thus, each player may get to actively attack a strong player. The actual given point award obtained at a time of winning the opponent player may not be known unless a competition with the player is executed. Thus, each player may actively attack various players with which the player may have not performed a competition. Accordingly, it may be possible to achieve vitalization of a competition game.

The association unit 334 may set the given point award assigned in a case where the execution player on a side of executing an attack wins, to be a value more than the given point award assigned in a case where the opponent player on a side of being attacked wins. In addition, the association unit 334 may not assign the given point award, in a case where the opponent player on a side of being attacked wins. Thus, each player may actively get to perform an attack without a concern of losing, and it may be possible to achieve vitalization of a competition game.

In a case where a player becomes too strong, the given point award assigned at a time of winning against another player may be reduced. Thus, in a case where the reference value of the character of a player is equal to or more than a predetermined value, the association unit 334 may provide means for reducing the reference value of the character of each player or means for increasing the reference value of the character of the opponent player, for each player. For example, the association unit 334 may store an item ID of an item for reducing the reference value of the character of a player or an item for increasing the reference value of the character of the opponent player, in association with each player. The association unit 334 may store the item ID as the owned item ID in the player table. Thus, the association unit 334 provides the corresponding item for the player. The means for reducing the reference value of the character of a player or the means for increasing the reference value of the character of the opponent player may not be limited to a form of an item. For example, a special effect held by a player, execution of a predetermined event by a player, and a competition with a predetermined counterpart by a player may be provided.

In a case where the given point award is determined to be increased as the value obtained by subtracting the reference value of the character of the losing player, from the reference value of the character of the winning player, becomes smaller, it may not be possible that a player in a group, who may have a character of the largest reference value in the opponent group obtains a large given point award. Thus, the association unit 334 may correct the given point award in accordance with the size of the reference value of the character of each player. For example, the association unit 334 may correct the given point award based on a relation between the reference value of the character of the winning player, and the reference value of the character of each of the players belonging to a group to which the winning player belongs, and a relation between the reference value of the character of the losing player, and the reference value of the character of each of the players belonging to a group to which the losing player belongs.

For example, the association unit 334 corrects the given point award to be increased, in a case where players having a reference value of which the size is in a range up to a predetermined rank among players belonging to a group win against players having a reference value of which the size is in a range up to a predetermined rank among players belonging to the opponent group. The association unit 334 may correct the given point award to be the maximum, in a case where a player having the largest reference value among players belonging to a group wins against a player having the largest reference value among players belonging to the opponent group.

The association unit 334 may calculate a division value obtained by dividing the reference value of the character of the winning player, by an average value of reference values of characters of players belonging to a group to which the winning player belongs, and may calculate a division value obtained by dividing the reference value of the character of the losing player, by an average value of reference values of characters of players belonging to a group to which the losing player belongs. In a case where both of the calculated division values are equal to or more than a predetermined value, the association unit 334 may correct the given point award to be increased.

Thus, each player may cause the reference value to be increased, so as to increase the given point award. Accordingly, it may be possible to vitalize a competition event.

The association unit 334 may determine the given point award in a case where the execution player wins, based on only the defense reference value of the character of the opponent player, without using the attack reference value of the character of the execution player. Similarly, the association unit 334 may determine the given point award in a case where the opponent player wins, based on only the attack reference value of the character of the execution player, without using the defense reference value of the character of the opponent player.

The association unit 334 may determine the deprivation point score in the following manner. In a case where the deprivation point score is to be deducted from the points of a group to which the losing player belongs, the association unit 334 may set the deprivation point score to be increased as the reference value of the character of the winning player becomes smaller, and to be increased as the reference value of the character of the losing player becomes larger. For example, the association unit 334 may determine the deprivation point score to be increased as a value obtained by subtracting the reference value of the character of the losing player, from the reference value of the character of the winning player, becomes smaller. That is, the association unit 334 may set the deprivation point score deducted from a point score in a case where the reference value of the character of the winning player is less than the reference value of the character of the losing player, to be larger than the deprivation point score deducted from a point score in a case where the reference value of the character of the winning player is equal to or more than the reference value of the character of the losing player. Thus, each player gets to actively attack a strong player. The actual deprivation point score obtained at a time of winning the opponent player may be may not be known unless a competition with the player may be executed. Thus, each player may actively attack various players with which the player may have not performed a competition. Accordingly, it may be possible to vitalize a competition game.

The association unit 334 may determine the deprivation point score to be smaller than the given point award. The deprivation points deducted at a time of losing in a competition may be set to be a small value, and thus it may be possible to suppress degradation of motivation of a player for a competition. The association unit 334 may not deduct the deprivation points of a group to which the execution player belongs, in a case where the execution player loses, but may deduct the deprivation point of a group to which the opponent player belongs, only in a case where the opponent player loses. Thus, each player actively gets to attack a character of another player without a concern of losing by another player, and it may be possible to vitalize a competition game.

Even in a case where the occurring attack is an attack to the center, the association unit 334 may assign the given point award to a group to which the execution player belongs, and deduct the deprivation points of a group to which the opponent player belongs, when the attack to the center succeeds.

The association unit 334 may create display data for displaying the result screen 520 or 530 in accordance with a competition result, and may send the created display data to the progress control unit 331.

In a case where the execution player loses, the association unit 334 may create display data for displaying the result screen 520 on which a message of losing in the competition, the deprivation point deprived by the competition, information regarding the execution player and the opponent player, and the like may be disposed. In a case where the execution player wins, the association unit 334 may create display data for displaying the result screen 530 on which a message of winning in the competition, the given point award assigned by the competition, information regarding the execution player and the opponent player, and the like may be disposed.

The second competition execution unit 335 may determine whether or not a predetermined period elapses from when a competition between two groups starts. In a case where the predetermined period elapses, the second competition execution unit 335 may determine a competition result between the groups, based on the total point score of each of the groups. The second competition execution unit 335 may extract the two groups relating to the competition combination from the group table, and may read the total point which may have been stored in the group table in association with each group. The second competition execution unit 335 may determine the group having the larger total point score to win, and may determine the group having the smaller total point score to lose. In this manner, the second competition execution unit 335 may determine a competition result between groups, based on the summation of the given point awards which may be stored in the group table in association with each group.

The second competition execution unit 335 may store an item ID of a predetermined item in the player table, in association with each player. The item ID may be stored as the owned item ID of a player belonging to the winning group. Thus, the second competition execution unit 335 may assign a perk such as a predetermined item, to each of players belonging to the winning group.

Figure 9:
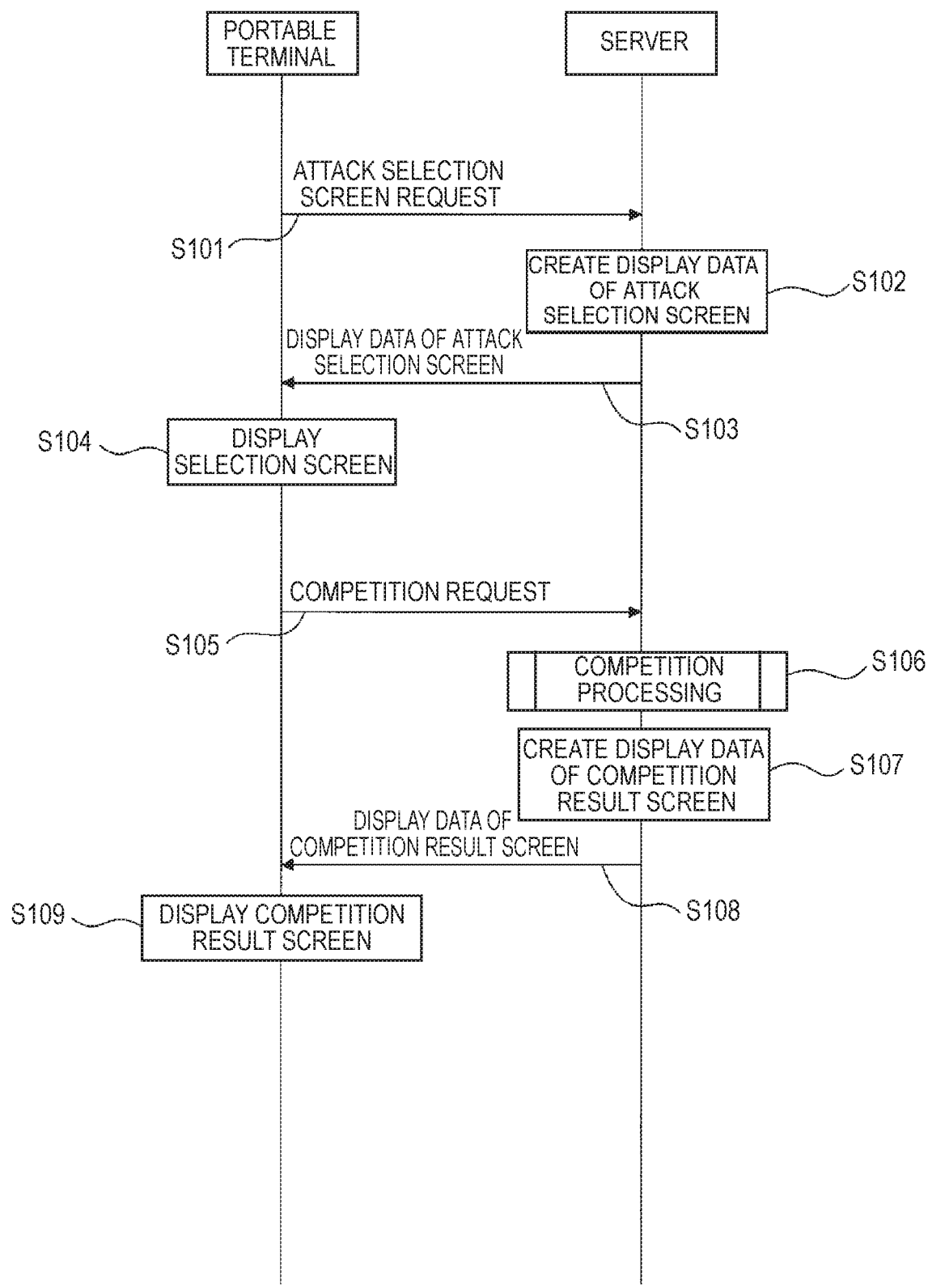
FIG. 9 is a diagram illustrating an example of operation sequences of the game system.

FIG. 9 is a diagram illustrating an example of an operation sequence relating to the game processing in the game system 1. The operation sequence may be mainly performed by the terminal processing unit 25 and the server processing unit 33, based on a program which may have been stored in the terminal storage unit 22 and the server storage unit 32 in advance. The operation sequence may be performed in cooperation with the components of the portable terminal 2 and the server 3.

Firstly, if a player presses the attack button 501 by using the operating unit 23 in a state where the home screen 500 may be displayed in the display unit 24 of the portable terminal 2, the browsing execution unit 251 of the portable terminal 2 may transmit an attack selection screen request to the server 3 through the terminal communication unit 21 (Step S101). In a case where the progress control unit 331 of the server 3 may receive the attack selection screen request from the portable terminal 2, the display data creation unit 332 may create display data of the attack selection screens 510 and 600 (Step S102). Then, the progress control unit 331 may transmit the created display data to the portable terminal 2 (Step S103). In a case where the display data is received from the server 3 through the terminal communication unit 21, the browsing execution unit 251 of the portable terminal 2 may create drawing data based on the received display data, and may display the attack selection screens 510 and 600 in the display unit 24 (Step S104).

Then, if the player presses the attack button 514 or 604 by using the operating unit 23 in a state where the attack selection screen 510 or 600 may be displayed in the display unit 24 of the portable terminal 2, the browsing execution unit 251 of the portable terminal 2 may transmit a competition request to the server 3 through the terminal communication unit 21 (Step S105). In a case where the progress control unit 331 of the server 3 receives the competition request from the portable terminal 2, the first competition execution unit 333 and the association unit 334 perform player competition processing (Step S106). Details of the player competition processing will be described later. Then, the association unit 334 may create display data for displaying the result screen 520 or 530 in accordance with a competition result (Step S107). Then, the first competition execution unit 333 may transmit the created display data to the portable terminal 2 (Step S108). In a case where the display data may be received from the server 3 through the terminal communication unit 21, the browsing execution unit 251 of the portable terminal 2 may create drawing data based on the received display data, and may display the result screen 520 or 530 in the display unit 24 (Step S109). With this, the operation sequence relating to the game processing may be ended.

Figure 10:
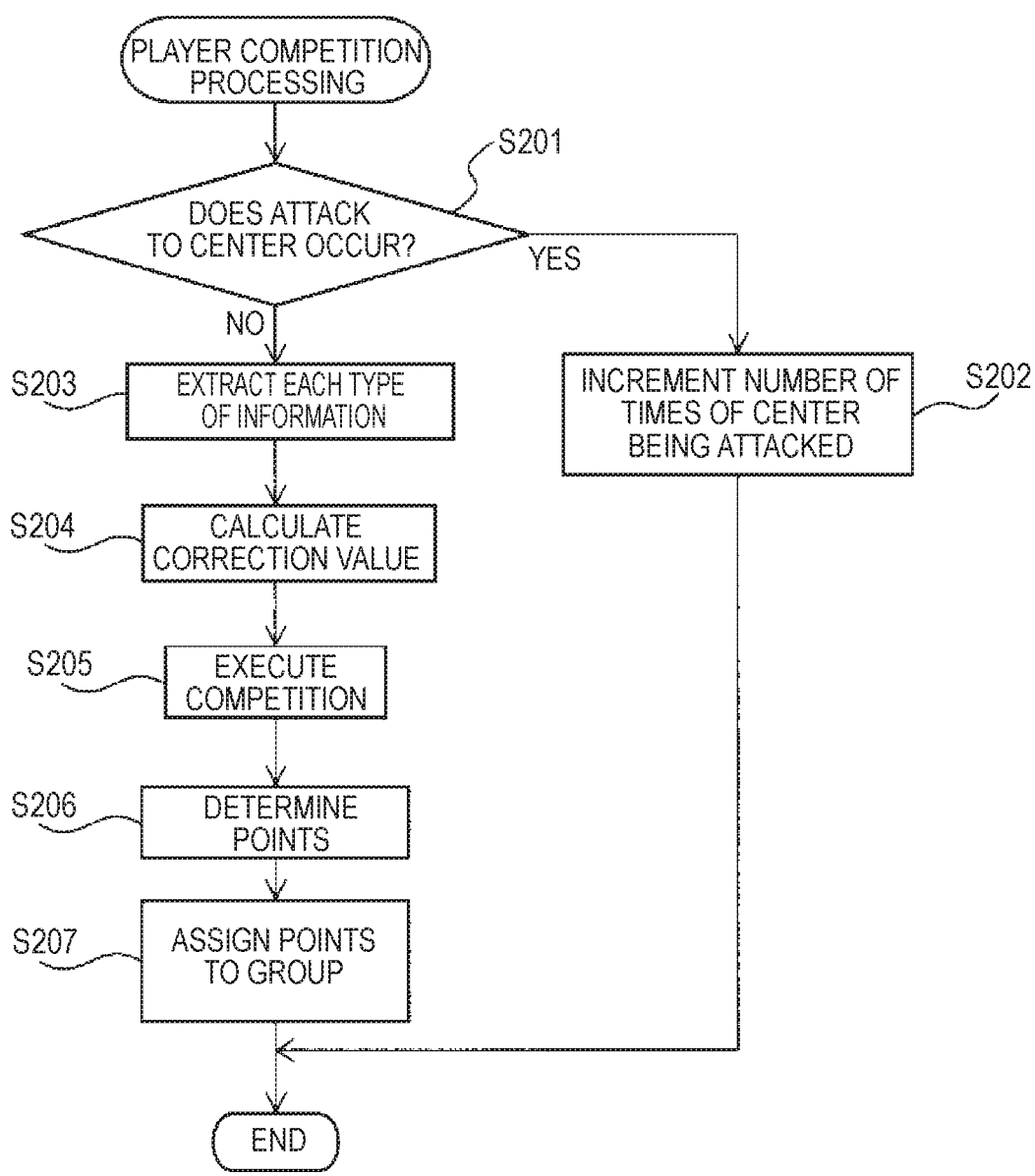
FIG. 10 is a diagram illustrating an example of an operation flow of player competition processing.

FIG. 10 illustrates an operation flow of the player competition processing performed by the first competition execution unit 333 and the association unit 334. The competition processing illustrated in FIG. 10 may be performed in Step S106 of FIG. 9.

Firstly, the first competition execution unit 333 may read information included in the competition request, and may determine whether the occurring attack may be an attack to a character of the opponent player or an attack to a center (Step S201).

In a case where the occurring attack is an attack to the center, the first competition execution unit 333 may specify the player ID of an execution player, which may be included in the competition request. The first competition execution unit 333 may extract a competition parameter and a group ID corresponding to the specified player ID of the execution player, from the player table. The first competition execution unit 333 may specify an opponent group ID corresponding to the extracted group ID, from the group table. The first competition execution unit 333 may increment (+1) the number of times of the center being attacked of the opponent group corresponding to the specified opponent group ID (Step S202). Then, a series of steps may be ended.

In a case where the occurring attack is an attack to the character of the opponent player, the first competition execution unit 333 may specify player IDs of an execution player and the opponent player, which may be included in the competition request. The first competition execution unit 333 may extract a competition parameter and a group ID corresponding to the specified player ID of each of the players, from the player table. The first competition execution unit 333 may extract the number of times of the center being attacked corresponding to the extracted group ID, from the group table (Step S203).

Then, the first competition execution unit 333 may calculate the correction value obtained by correcting the reference value of the competition parameter of the character of a player, based on the number of times of the center being attacked, of each group to which the player belongs (Step S204).

Then, the first competition execution unit 333 may execute a competition between an execution player and the opponent player, based on the calculated correction value of the character of each player (Step S205).

Then, the association unit 334 may determine the given point award based on the reference value of the character of the player (Step S206).

Then, the association unit 334 may assign the determined given point award to a group to which the winning player belongs (Step S207), and ends a series of steps.

Figure 11:
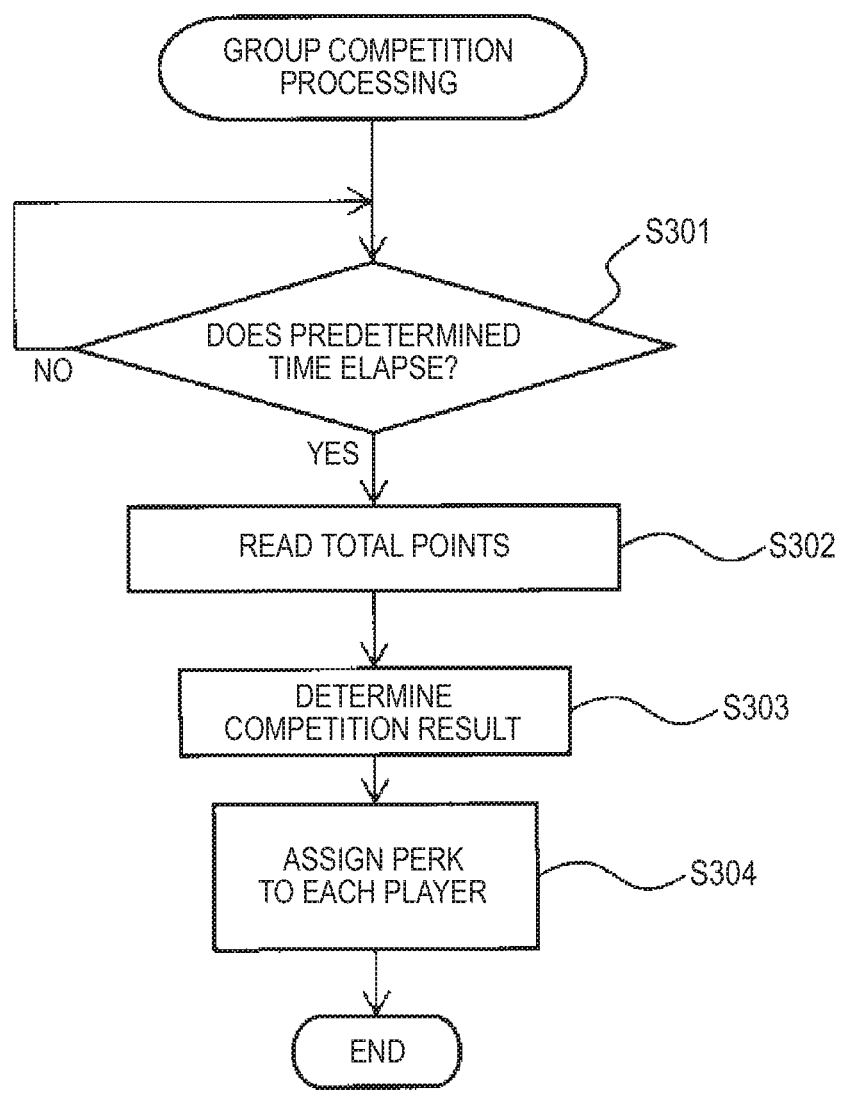
FIG. 11 is a diagram illustrating an example of an operation flow of group competition processing.

FIG. 11 illustrates an operation flow of the group competition processing performed by the second competition execution unit 335. The operation sequence may be mainly performed by the server processing unit 33, based on a program which may be stored in the server storage unit 32 in advance. The operation sequence may be performed in cooperation with the components of the server 3. The operation sequence may be performed on a competition combination in which a competition may be executed.

Firstly, the second competition execution unit 335 may wait until a predetermined period elapses from when a competition between two groups starts (Step S301).

In a case where the predetermined period elapses from when the competition starts, the second competition execution unit 335 may extract the two groups relating to the competition combination from the group table, and may read the total point scores which may have been stored in the group table in association with each group (Step S302).

Then, the second competition execution unit 335 may determine a competition result between the groups, based on the total point which may have been read (Step S303).

Then, the second competition execution unit 335 may assign a perk to players belonging to the winning group (Step S304), which may end a series of steps.

As described above, in a case where the center of each group may be attacked, the server 3 may not change the reference value which may have an influence on determination of the given point award, but may change the correction value which may have an influence on wins and defeats in a competition between players, among the competition parameters of the character of the player belonging to each group. Thus, it may be possible to improve strategic characteristics for obtaining a point in a competition game, and to maintain and improve the will of a player to perform a game.

The present invention may not be limited to the embodiment. For example, not a game content relating to an object fixed at a predetermined position, but a game content relating to the character of a predetermined player belonging to a group may be set as the center of each group. In this case, an action for changing the correction value of the competition parameter of the character of a player belonging to each group may be an attack to the game content relating to the character of the predetermined player.

In this case, a character of a player, which may have been set as the center among characters of players belonging to the opponent group, may be displayed on the attack selection screen displayed in the portable terminal 2 of the execution player, so as not to enable the center character to be distinguished from a character of another player. Thus, in a case where the own character attacks a certain character, it may not be possible that the execution player recognizes whether defense power of the character of a player belonging to the opponent group can be reduced. Thus, it may be possible to improve game characteristics. A game screen for displaying the character of the player, which may have been set as the center among characters of players belonging to the opponent group, so as to enable the center character to be distinguished from the character of another player may be displayed in the portable terminal 2 of a player belonging to the opponent group. Thus, in a case where a certain character in a group to which a player belongs may be attacked, the player can recognize whether the defense power may be reduced. Thus, a strategy for causing the character not to be attacked can be established.

In a case where the server 3 may receive an inquiry regarding a player which may have been set as the center of the opponent group, from the portable terminal 2 of the execution player, the server 3 may notify the portable terminal 2 of a player belonging to the opponent group, of a message indicating the inquiry. In this case, the server 3 may display information of implying the character of the player which may have been set as the center, such as a hint of the character of the player which may have been set as the center, in accordance with a request from the portable terminal 2 of a player belonging to the opponent group. Thus, it may be possible to vitalize communication between players.

The server 3 may set a game content group in which game media relating to characters of a plurality of players belonging to each group may be respectively disposed at predetermined positions, for each group. The server 3 may perform a competition between groups, by using the game content group which may have been set in the group. In this case, the server 3 may change the competition parameter of the character of a player, in accordance with the position at which the game content relating to the character of the player may be disposed. The server 3 may change cost consumed from the physical strength of the character of a player whenever a competition may be executed, in accordance with the position at which the game content relating to the character of the player may be disposed.

For example, the server 3 may set attack power (or cost) of a character of a player having a game content which may be disposed at a position (the forward) close to the game content group of the opponent group, to be larger than attack power (or cost) of a character of a player having a game content which may be disposed at a position (the rear) separate from the game content group of the opponent group. The server 3 may set defense power of a character of a player having a game content which may be disposed in the front, to be smaller than defense power of a character of a player having a game content which may be disposed in the rear. In a case where a competition between groups may be executed by using such a game content group, the server 3 may automatically dispose the character of the player, which may have been set as the center, at a predetermined position (for example, the rear). Thus, since each character may be automatically disposed at a position suitable for a strategy, it may be possible to improve convenience of a player.

In a case where an attack to the center of a group may be performed, the server 3 may change the reference value in addition to the correction value of the competition parameter of the character of a player belonging to a group. In this case, a percentage of changing the reference value of the competition parameter of the character of a player belonging to a group may be lower than a percentage of changing the correction value. In this case, it may also be possible to improve strategic characteristics for obtaining points in a competition game.

In some embodiments, the character of a player cannot attack both of the center and the character of the opponent player. The character of a player may be predetermined so as to be capable of performing an attack against only one of the center and the character of the opponent player. In this case, the server 3 may preset a role of a player (whether the player attacks the center or the character of the opponent player), in accordance with a request from the player. Different roles may be assigned for each player, and thus it may be possible to improve strategic characteristics in a competition game.

In this case, the server 3 may respectively assign individual given point awards to a player who attacks the center and a player who attacks the character of the opponent player. The server 3 may calculate a rank of each player, based on the given point award. The server 3 may assign a perk to each of the players, based on the ranks which may be respectively calculated for the player who attacks the center and the player who attacks the character of the opponent player. Thus, it may be possible to maintain motivation of a player who attacks the center.

Further, a player belonging to a group may reclaim the center which may have been attacked by the character of a player belonging to the opponent group, so as to restore the correction value of the character of the player. The player who can reclaim the center may be limited to some players among players belonging to the group. In this case, the server 3 may preset a player who can reclaim the center among players belonging to the group, in accordance with a request from a player. In a case where the server 3 may receive a request for reclaiming the attacked center, from the portable terminal 2 of a player which may have been set as a player who can reclaim the center, the server 3 may decrement (−1) or resets the number of times of the center being attacked, of the center in the group table. The character of the player who may have been set as a player who can reclaim the center may be not attacked by the character of another player. Thus, it may be possible to further improve strategic characteristics in a competition game.

Instead of the attack selection screen, a screen for enabling characters of the players belonging to two groups which relate to a competition to be moved, and perform an attack, in accordance with an operation using the operating unit 23 by the players may be displayed in the portable terminal 2. The player moves the own character and comes into contact with the character or the center of another player on a screen displayed in the portable terminal 2, and thus it may be possible to attack the character of another player or the center.

For example, the functions of the above-described server processing unit 33 may be performed in the terminal processing unit 25 of the portable terminal 2. In this case, if the player table and the group table may be stored in the terminal storage unit 22, it may be may not be necessary for communication with the server 3 to be performed whenever the processing may be performed. In addition, it may be possible to realize the above functions only in the portable terminal 2. For example, a game performed in the portable terminal 2 may be a hybrid-game in which the server 3 and the portable terminal 2 handle a portion of the processing. In this case, for example, web display and a native display may be provided. In the web display, the screen relating to the progress of the game may be displayed in the portable terminal 2 based on display data generated by the server 3. In the native display, the screen and the like used in a competition may be displayed by a native application which may be installed on the portable terminal 2.

The skilled person of the related art can understand that various changes, substitutions, and modifications may be added without departing from the gist and the scope of the present invention.

What is claimed is:

1. A non-transitory computer-readable storage medium comprising program code that, when executed, causes a computer including a storage unit to execute, with a processor, steps comprising performing a competition game between a plurality of groups, the plurality of groups comprising a plurality of players each belonging to a group in the plurality of groups;
   wherein the storage unit is configured to store a reference value of a competition parameter for each of the plurality of players, and is further configured to store a predetermined game content for each of the plurality of groups;
   wherein performing a competition game comprises:
   displaying, in a terminal of a player of a group in the plurality of groups, a game screen, the terminal configured to recognize the predetermined game content stored for the group in the plurality of groups and configured to display the predetermined game content stored for the group in the plurality of groups in such a manner as to provide identifying information about the player associated with the predetermined game content;

displaying, in a terminal of another player of another group in the plurality of groups, a game screen, the terminal configured to display the predetermined game content stored for the group in the plurality of groups, and configured to obfuscate the predetermined game content stored for the group in the plurality of groups, so as not to provide identifying information about the predetermined game content in the terminal of the another player;

determining an initial value of a correction value for two players participating in a competition comprising the player and the another player, each correction value being based on a reference value of the two players and a degree of adjustment of the correction value based on the predetermined game content;

executing the competition between the two players, wherein at least one outcome within the competition is determined based on the correction value of the player and the correction value of the another player, the two players consisting of a winning player belonging to a first group in the plurality of groups and a losing player belonging to a second group in the plurality of groups;

storing a point value which is determined based on the reference value of the at least one player, in the storage unit, in association with the first group, to which the winning player in the competition belongs; and determining a result of the competition between the first group and the second group, based on a summation of points which are stored in the storage unit in association with the first group and a summation of points which are stored in the storage unit in association with the second group, and wherein executing the competition between the two players further comprises determining when a predetermined action is performed on the predetermined game content of the group to which the at least one player belongs, and, when the predetermined action is performed on the predetermined game content of the group to which the at least one player belongs, performing a control step, the control step comprising changing the correction value of the at least one player without changing the reference value of the at least one player;

wherein executing the competition between the two players further comprises automatically and continuously adjusting the correction value towards the initial value of the correction value as a function of time, and automatically updating a graphical user interface of the player and a graphical user interface of the another player based on continuous automatic adjustment of the correction value; and wherein the at least one outcome within the competition is determined based on an adjusted correction value.

2. The non-transitory computer-readable medium according to claim 1,
wherein the predetermined game content of each of the plurality of groups is a game content relating to a character of a predetermined player belonging to each group, and
the predetermined action is an attack against the predetermined game content.

3. The non-transitory computer-readable medium according to claim 1,
wherein the computer is configured to calculate, with the processor, a difference value obtained by subtracting the reference value of the losing player from the reference value of the winning player; and
wherein the point value is increased based on the difference value becoming smaller.

4. The non-transitory computer-readable medium according to claim 3,
wherein the point value is corrected based on a relation between the reference value of the winning player and one or more reference values of one or more players belonging to the first group, and a relation between the reference value of the losing player and one or more reference values of one or more players belonging to the second group.

5. The non-transitory computer-readable medium according to claim 1,
wherein the control step further comprises reducing the correction value every time the predetermined action is performed on the predetermined game content.

6. The non-transitory computer-readable medium according to claim 1,
wherein the control step further comprises changing the correction value based on at least one of: a number of times that a specific player belonging to a group in the plurality of groups consecutively defeats one or more players belonging to another group in the plurality of groups, or a number of times that a plurality of players belonging to the group in the plurality of groups alternately defeat the one or more players belonging to the another group in the plurality of groups.

7. A control method which is configured to be executed by a computer which includes a storage unit and which is configured to perform, with a processor, a competition game between a plurality of groups, the plurality of groups comprising a plurality of players each belonging to a group in the plurality of groups;

wherein the storage unit is configured to store a reference value of a competition parameter for each of the plurality of players, and is configured to store a predetermined game content for each of the plurality of groups;

the method comprising:

displaying, in a terminal of a player of a group in the plurality of groups, a game screen, the terminal configured to recognize the predetermined game content stored for the group in the plurality of groups and configured to display the predetermined game content stored for the group in the plurality of groups in such a manner as to provide identifying information about the player associated with the predetermined game content;

displaying, in a terminal of another player of another group in the plurality of groups, a game screen, the terminal configured to display the predetermined game content stored for the group in the plurality of groups, and configured to obfuscate the predetermined game content stored for the group in the plurality of groups, so as not to provide identifying information about the predetermined game content in the terminal of the another player;

determining an initial value of a correction value for two players participating in a competition comprising the player and the another player, each correction value being based on a reference value of the two players and a degree of adjustment of the correction value based on the predetermined game content;

executing the competition between the two players, wherein at least one outcome within the competition is determined based on the correction value of the player and the correction value of the another player, the two players consisting of a winning player belonging to a first group in the plurality of groups and a losing player belonging to a second group in the plurality of groups;

storing a point value which is determined based on the reference value of the at least one player, in the storage unit, in association with the first group, to which the winning player in the competition belongs; and determining a result of the competition between the first group and the second group, based on a summation of points which are stored in the storage unit in association with the first group and a summation of points which are stored in the storage unit in association with the second group, wherein executing the competition between the two players further comprises determining when a predetermined action is performed on the predetermined game content of the group to which the at least one player belongs, and, when the predetermined action is performed on the predetermined game content of the group to which the at least one player belongs, changing the correction value of the at least one player and preventing change in the reference value of the at least one player;

wherein executing the competition between the two players further comprises automatically and continuously adjusting the correction value towards the initial value of the correction value as a function of time, and automatically updating a graphical user interface of the player and a graphical user interface of the another player based on continuous automatic adjustment of the correction value; and wherein the at least one outcome within the competition is determined based on an adjusted correction value.

* * * * *